US012741843B2

(12) United States Patent
Suzuki et al.

(10) Patent No.: US 12,741,843 B2
(45) Date of Patent: Sep. 22, 2026

(54) MEDIA PROCESSING APPARATUS, IMAGE FORMING APPARATUS, AND IMAGE FORMING SYSTEM

(71) Applicants: Yuji Suzuki, Kanagawa (JP); Yuusuke Shibasaki, Tokyo (JP); Yusuke Hirono, Kanagawa (JP); Atsushi Shinoda, Kanagawa (JP); Shuuto Tohkaishi, Kanagawa (JP); Satoshi Hirata, Kanagawa (JP); Shingo Yoshizawa, Kanagawa (JP); Suzuka Fujita, Kanagawa (JP); Naofumi Yoshida, Kanagawa (JP); Ryota Takayama, Kanagawa (JP); Takahiro Watanabe, Kanagawa (JP); Jun Yamada, Kanagawa (JP); Takuya Morinaga, Tokyo (JP); Wataru Nozaki, Kanagawa (JP); Kanako Fujisaki, Kanagawa (JP)

(72) Inventors: Yuji Suzuki, Kanagawa (JP); Yuusuke Shibasaki, Tokyo (JP); Yusuke Hirono, Kanagawa (JP); Atsushi Shinoda, Kanagawa (JP); Shuuto Tohkaishi, Kanagawa (JP); Satoshi Hirata, Kanagawa (JP); Shingo Yoshizawa, Kanagawa (JP); Suzuka Fujita, Kanagawa (JP); Naofumi Yoshida, Kanagawa (JP); Ryota Takayama, Kanagawa (JP); Takahiro Watanabe, Kanagawa (JP); Jun Yamada, Kanagawa (JP); Takuya Morinaga, Tokyo (JP); Wataru Nozaki, Kanagawa (JP); Kanako Fujisaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 244 days.

(21) Appl. No.: 18/679,627

(22) Filed: May 31, 2024

(65) Prior Publication Data

US 2024/0400335 A1 Dec. 5, 2024

(30) Foreign Application Priority Data

May 31, 2023 (JP) ................................ 2023-090500

(51) Int. Cl.
*B65H 37/04* (2006.01)
*B41J 3/44* (2006.01)
(Continued)

(52) U.S. Cl.
CPC ................ *B65H 37/04* (2013.01); *B41J 3/44* (2013.01); *B65H 29/001* (2013.01);
(Continued)

(58) Field of Classification Search
CPC .... B31F 5/001; B31F 5/02; B31F 2201/0754; B31F 2201/0771; B31F 2201/0779;
(Continued)

(56) References Cited

U.S. PATENT DOCUMENTS 7,896,338 B2 * 3/2011 Kamiya ................ B65H 39/10 271/220
8,006,971 B2 * 8/2011 Iguchi .................... B65H 31/38 270/58.11
(Continued)

FOREIGN PATENT DOCUMENTS

JP 2012-176848 A 9/2012
JP 2013-086880 A 5/2013
JP 2015-139959 A 8/2015

*Primary Examiner* — Leslie A Nicholson, III
(74) *Attorney, Agent, or Firm* — XSENSUS LLP

(57) ABSTRACT

A media processing apparatus includes: an internal tray; an ejection tray; a first conveyor to convey a sheet medium in a first conveyance direction leading to the ejection tray via the internal tray; a second conveyor to convey the medium in a second conveyance direction; a binder including a pair of clampers to clamp sheet media stacked on the internal tray and being switchable among an out-of-contact state in which the clampers are out of contact, a clamping state in which the
(Continued)

media are clamped by the clampers, and a binding state in which the media are pressed and bound by the clampers. The circuitry switches the binder into the clamping state when an (N+1)-th sheet medium is conveyed in the first direction while contacting an N-th sheet medium in a state in which N sheets of sheet media are stacked on the internal tray, N being a natural number.

18 Claims, 22 Drawing Sheets

(51) Int. Cl.
*B65H 29/00* (2006.01)
*G03G 15/00* (2006.01)

(52) U.S. Cl.
CPC .................... *G03G 15/6541* (2013.01); *B65H 2301/51611* (2013.01); *B65H 2301/51616* (2013.01); *B65H 2511/30* (2013.01)

(58) Field of Classification Search
CPC ........ B31F 2201/0784; G03G 15/6541; G03G 15/6544; G03G 2215/00852; G03G 2215/00827; G03G 2215/00864; B65H 29/001; B65H 31/26; B65H 37/04; B65H 2511/30; B65H 2301/51611; B65H 2301/51616; B65H 2301/4223; B65H 2301/43828; B65H 2301/4382
USPC ............................................ 270/58.08, 58.09
See application file for complete search history.

(56) References Cited

U.S. PATENT DOCUMENTS

| | | | | |
|---|---|---|---|---|
| 9,315,356 | B2 * | 4/2016 | Yoshida | B31F 5/02 |
| 9,415,560 | B2 * | 8/2016 | Morinaga | B31F 5/02 |
| 12,043,508 | B2 * | 7/2024 | Oikawa | B31F 1/36 |
| 2012/0083400 | A1 | 4/2012 | Shibasaki et al. | |
| 2012/0153556 | A1 | 6/2012 | Sugiyama et al. | |
| 2012/0282004 | A1 | 11/2012 | Furuhashi et al. | |
| 2015/0360899 | A1 | 12/2015 | Takahashi et al. | |
| 2016/0340144 | A1 | 11/2016 | Sakano et al. | |
| 2016/0360053 | A1 | 12/2016 | Suzuki et al. | |
| 2020/0140222 | A1 | 5/2020 | Takahashi et al. | |

* cited by examiner

MEDIA PROCESSING APPARATUS, IMAGE FORMING APPARATUS, AND IMAGE FORMING SYSTEM

CROSS-REFERENCE TO RELATED APPLICATION

This patent application is based on and claims priority pursuant to 35 U.S.C. § 119(a) to Japanese Patent Application No. 2023-090500, filed on May 31, 2023, in the Japan Patent Office, the entire disclosure of which is hereby incorporated by reference herein.

BACKGROUND

Technical Field

Embodiments of the present disclosure relate to a media processing apparatus, an image forming apparatus, and an image forming system.

Related Art

Media processing apparatuses are known in the related art that bind sheet-shaped media, on which images are formed by image forming apparatuses, into a bundle of media. Since sheets of paper are widely known as an example of the sheet-shaped media, a "sheet bundle" that is a bundle or stack of sheets of paper is used as an example of a bundle of sheet-shaped media in the following description.

As an example of such a media processing apparatus, there is a paper sheet processing apparatus including a first conveyor that conveys sheets of paper toward an internal tray in a first conveyance direction, a second conveyor that conveys sheets of paper stacked on the internal tray in a second conveyance direction that is a direction different from the first conveyance direction, and a binder that closes downstream end portions of a plurality of sheets of paper stacked on the internal tray in the second conveyance direction.

SUMMARY

According to an embodiment of the present disclosure, a media processing apparatus includes: an internal tray; an ejection tray to stack sheet media; a first conveyor to convey a sheet medium in a first conveyance direction leading to the ejection tray via the internal tray; a second conveyor to come into and out of contact with the sheet medium stacked on the internal tray and convey the sheet medium in a second conveyance direction different from the first conveyance direction; a binder disposed at a downstream end of the internal tray in the second conveyance direction, to bind sheet media stacked on the internal tray, the binder including a pair of clampers facing each other to clamp the sheet media stacked on the internal tray; and control circuitry configured to control operations of the first conveyor, the second conveyor, and the binder. The binder is switchable among an out-of-contact state in which the pair of clampers are out of contact with each other to receive the sheet medium, a clamping state in which the sheet media are clamped by the pair of clampers, and a binding state in which the sheet media are pressed and bound by the pair of clampers. The control circuitry switches the binder into the clamping state when an (N+1)-th sheet medium is conveyed in the first conveyance direction while contacting an N-th sheet medium in a state in which N sheets of sheet media are stacked on the internal tray, wherein N is a natural number.

According to an embodiment of the present disclosure, an image forming apparatus includes a housing; an image former housed in the housing to form an image on a sheet medium; and the media processing apparatus. The media processing apparatus is detachably supported by the housing and processes the sheet medium on which the image is formed by the image former.

According to an embodiment of the present disclosure, an image forming system includes an image forming apparatus to form an image on a sheet medium; and the media processing apparatus according to claim 1 that is connected to the image forming apparatus.

According to an embodiment of the present disclosure, a media processing method, includes conveying, with a first conveyor, a sheet medium in a first conveyance direction leading to an ejection tray via an internal tray; coming a second conveyor into and out of contact with the sheet medium stacked on the internal tray and conveying the sheet medium in a second conveyance direction different from the first conveyance direction; binding, with a binder, sheet media stacked on the internal tray; controlling operations of the first conveyor, the second conveyor, and the binder, the binder being switchable among an out-of-contact state in which a pair of clampers of the binder are out of contact with each other to receive the sheet medium, a clamping state in which the sheet media are clamped by the pair of clampers, and a binding state in which the sheet media are pressed and bound by the pair of clampers; and switching the binder into the clamping state when an (N+1)-th sheet medium is conveyed in the first conveyance direction while contacting an N-th sheet medium in a state in which N sheets of sheet media are stacked on the internal tray, wherein N is a natural number.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
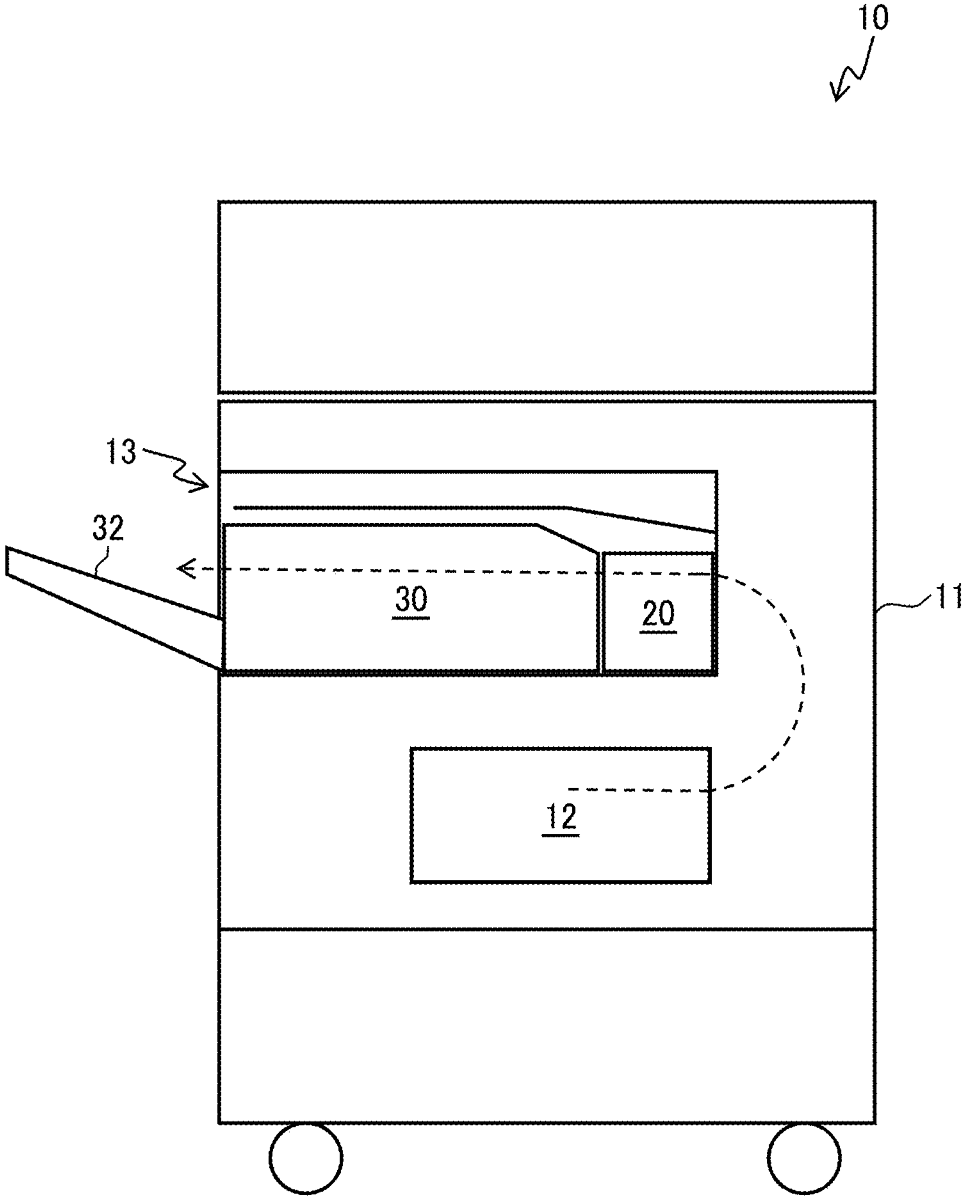
FIG. 1 is an external view of an image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is provided of an image forming apparatus 10 according to embodiments of the present disclosure with reference to the drawings. FIG. 1 is an external view of the image forming apparatus 10. The image forming apparatus 10 is an apparatus that forms an image on a sheet S (typically, a sheet of paper), which is an example of a sheet-shaped medium. As illustrated in FIG. 1, the image forming apparatus 10 includes a housing 11 and an image former 12.

The housing 11 has a box shape to form an internal space for accommodating components of the image forming apparatus 10. The housing 11 has an in-body space 13 that is accessible from the outside of the image forming apparatus 10. The in-body space 13 is located, for example, slightly above the center of the housing 11 in the vertical direction. The in-body space 13 is exposed to the outside by cutting out the outer wall of the housing 11. Further, the punch hole drilling unit 20 and the binding unit 30 (media processing apparatus) can be attached to the in-body space 13.

The image former 12 forms an image on the sheet S accommodated on the tray, and ejects the sheet S on which the image is formed to the punch hole drilling unit 20, the binding unit 30, or the liquid application unit. The image former 12 may be an inkjet image forming device that forms an image with ink or an electrophotographic image forming device that forms an image with toner. Since the configuration of the image former 12 is already known, a detailed description thereof will be omitted.

The punch hole drilling unit 20 is attached to the in-body space 13 of the image forming apparatus 10 on the downstream side of the image former 12 and on the upstream side of the binding unit 30 in the conveyance path of the sheet S from the image former 12 to the binding unit 30 (the path indicated by the dashed arrow in FIG. 1). That is, the sheet S on which an image is formed by the image former 12 is first delivered to the punch hole drilling unit 20 and subjected to a punch hole drilling process to be described later, and then delivered to the binding unit 30 and subjected to a binding process to be described later.

Further, the punch hole drilling unit 20 is detachably attached to the image forming apparatus 10. When the punch hole drilling unit 20 is removed, the sheet S on which an image is formed by the image former 12 is directly delivered to the binding unit 30 and subjected to the binding process. Further, another process unit such as a liquid application unit is detachably attached to a position where the punch hole drilling unit 20 is removed in the in-body space 13. That is, the image forming apparatus 10 allows the punch hole drilling unit 20 and the liquid application unit to be interchanged according to the application.

When the liquid application unit is attached, the sheet S on which the image is formed by the image former 12 is first delivered to the liquid application unit and subjected to the liquid applying process, and then delivered to the binding unit 30 and subjected to the binding process. The liquid applying process is a process of applying liquid to an intended binding position to be bound by the binding unit 30 on the surface of the sheet S. At the position where the punch hole drilling unit 20 is removed in the in-body space 13, a unit that performs an arbitrary process on the sheet S can be attached without being limited to the liquid application unit.

Figure 2A:
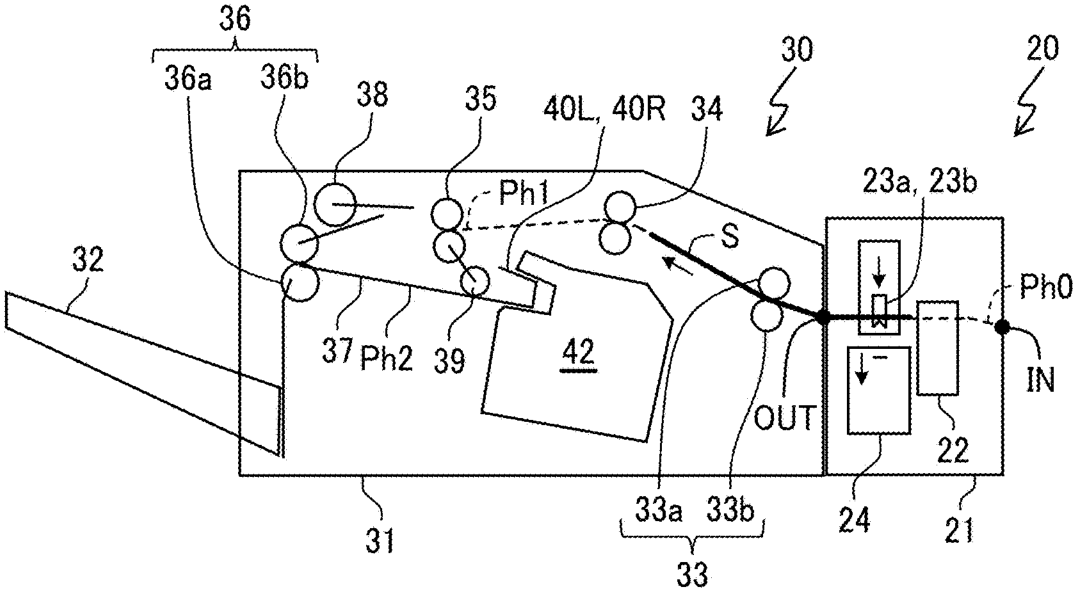
FIGS. 2A and 2B are diagrams illustrating an internal configuration of a punch hole drilling unit and a binding unit.
Figure 2B:
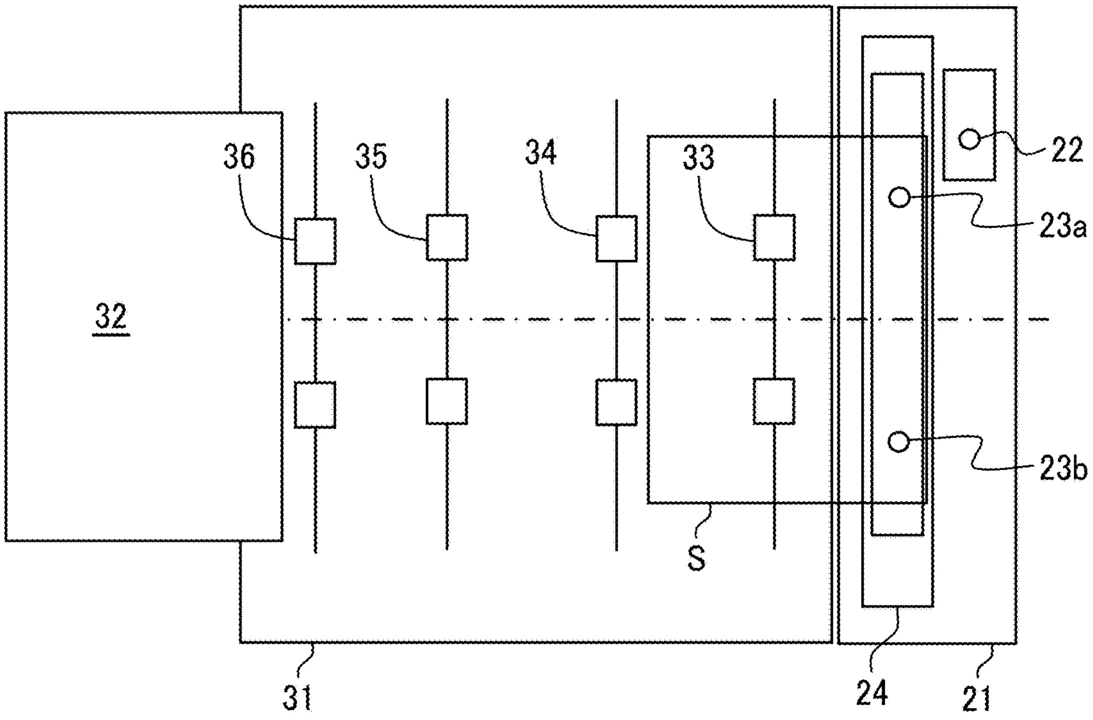

FIGS. 2A and 2B are diagrams illustrating an internal configuration of the punch hole drilling unit 20 and the binding unit 30. Each of the punch hole drilling unit 20 and the binding unit 30 is unitized, and an input/output interface of the sheet S can be connected thereto. That is, the input interface IN of the punch hole drilling unit 20 is connected to the output interface of the image former 12. Further, the input interface of the binding unit 30 is connected to the output interface of the image former 12 and the output interface OUT of the punch hole drilling unit 20.

As illustrated in FIGS. 2A and 2B, the punch hole drilling unit 20 includes a housing 21, a sheet sensor 22, punch pins 23*a* and 23*b*, and a punch chad container 24. The housing 21 has an internal space for accommodating components of the punch hole drilling unit 20. The internal space of the housing 21 has a conveying path Ph0 through which the sheet passes on which an image is formed by the image former 12. The sheet sensor 22 detects that the sheet S supplied from the image former 12 has reached a predetermined position. The punch pins 23*a* and 23*b* punch the sheet S detected by the sheet sensor 22. The punch chads that have fallen off from the sheet S fall into the punch chad container 24. The above-described punch hole drilling unit 20 performs the punching process for punching the sheet S.

Figure 3A:
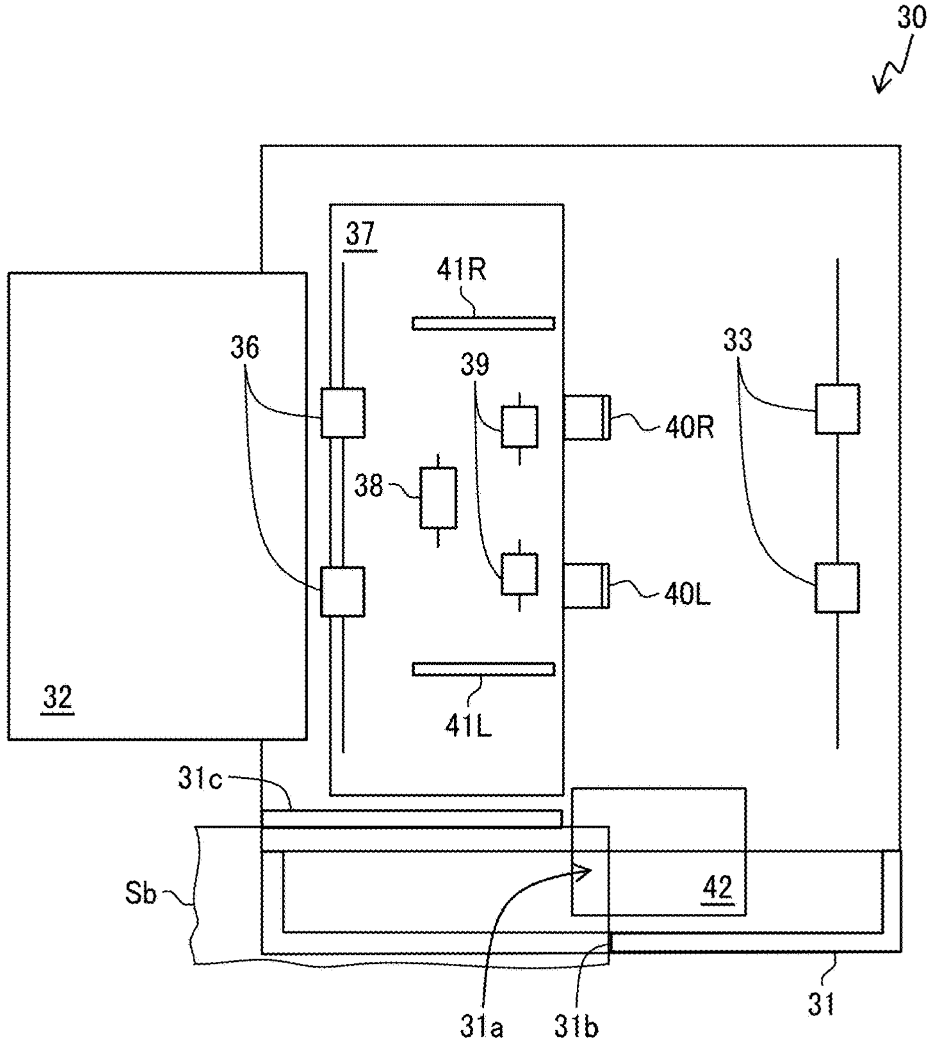
FIGS. 3A and 3B are views of a binding unit as viewed in a thickness direction and a main scanning direction.
Figure 3B:
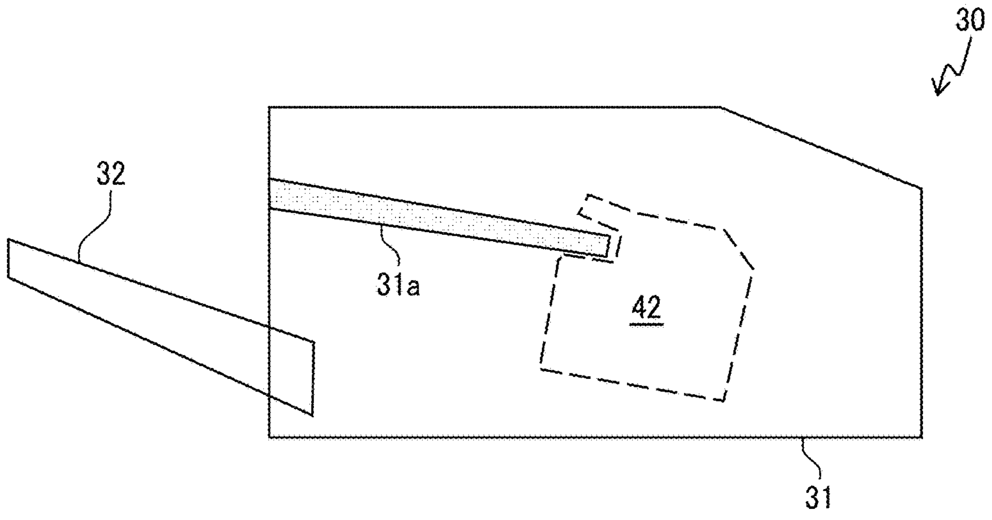

FIGS. 3A and 3B are views of the binding unit 30 as viewed in the thickness direction A and the main scanning direction B. The binding unit 30 performs binding process (post-process) of bundling and binding the sheet bundle Sb on which an image is formed by the image former 12. As illustrated in FIGS. 2A to 3B, the binding unit 30 includes a binding case 31, an ejection tray 32, a plurality of conveyance roller pairs 33, 34, 35, and 36 (first conveyor), an internal tray 37, a tapping roller 38 (second conveyor), a return roller 39, end fences 40L and 40R, side fences 41L and 41R (main scanning direction aligners), and a stapler 42 (binder).

The binding case 31 has a box shape in which an internal space for accommodating components of the binding unit 30 is formed. Further, the internal space of the binding case 31 includes conveying paths Ph1 and Ph2, which are spaces through which the sheet S passes. The ejection tray 32 is supported by an outer surface of the binding case 31. The ejection tray 32 stacks the sheet S or the sheet bundle Sb conveyed by the conveyance roller pairs 33 to 36.

The conveyance roller pairs 33 to 36 are disposed on the conveying path Ph1 at a predetermined interval. The conveyance roller pairs 33 to 36 conveys the sheet S in the first conveyance direction along the conveying path Ph1. The conveying path Ph1 is a path from the input interface of the binding unit 30 to the ejection tray 32 via the internal tray 37. The first conveyance direction is a direction from the input interface of the binding unit 30 to the ejection tray 32 via the internal tray 37.

The conveyance roller pair 33 includes a driving roller 33*a* and a driven roller 33*b* arranged to face each other with the conveying path Ph1 interposed therebetween. The driving roller 33*a* and the driven roller 33*b* are rotatably supported by the binding case 31. The driving roller 33*a*, to which the rotation driving force of the conveyance motor is transmitted, rotates forward in the first conveyance direction in which the sheet S is conveyed (clockwise in FIGS. 2A and 2B). The driven roller 33*b* is arranged to face the driving roller 33*a* with the conveying path Ph1 interposed therebetween, and is driven with the rotation of the driving roller 33*a*. Then, when the conveyance motor is driven in a state where the driving roller 33*a* and the driven roller 33*b* clamp the sheet S, the sheet S is conveyed in the first conveyance direction along the conveying path Ph1.

The basic configuration of the conveyance roller pairs 34 to 36 is common to the conveyance roller pair 33. However, the conveyance roller pair 36 includes a driving roller 36*a* and a driven roller 36*b* that can come into and out of contact with the driving roller 36*a*. Further, the conveyance roller pair 35 may slide in the width direction in order to implement a sorting process of shifting the sheet S in the width direction and ejecting the sheet S to the ejection tray 32. The conveyance roller pair 36 is provided at an end portion of the internal tray 37 opposite to the stapler 42 (an upstream end portion of the internal tray 37 in the second conveyance direction).

The internal tray 37 temporarily stacks a plurality of sheets S conveyed by the conveyance roller pair 36. The tapping roller 38 is supported at a leading end of a rotation arm above the internal tray 37. When the rotation arm rotates, the tapping roller 38 abuts on the upper surface of the sheet S that has entered between the driving roller 36*a* and the driven roller 36*b* out of contact with each other (in other words, the sheet S that has reached the internal tray 37). When the tapping roller 38 rotate in this state, the sheet S is conveyed in the second conveyance direction along the conveying path Ph2. The return roller 39 abuts on the upper surface of the sheet S stacked on the internal tray 37 and rotates to guide the sheet S toward the conveyance roller pair 36.

The conveying path Ph2 is a path that branches from the conveying path Ph1 at the position of the conveyance roller pair 36 and reaches the end fences 40L and 40R and the stapler 42 along the stacking surface (upper surface) of the internal tray 37. The second conveyance direction is a direction from the conveyance roller pair 36 to the end fences 40L and 40R and the stapler 42 along the stacking surface of the internal tray 37. That is, the second conveyance direction is a direction different from the first conveyance direction (typically, the reverse direction). A direction orthogonal to the second conveyance direction and the thickness direction of the sheet S stacked on the internal tray 37 is referred to as a "main scanning direction".

The conveyance roller pair 36 is disposed downstream of the conveyance roller pair 35 in the first conveyance direction. The internal tray 37 is disposed below the conveyance roller pair 35. Therefore, the sheet S conveyed by the conveyance roller pair 35 enters between the driving roller 36*a* and the driven roller 36*b* of the conveyance roller pair 36. Further, the sheet S whose rear end has passed through the conveyance roller pair 35 falls toward the internal tray 37 and is stacked on the internal tray 37. In addition, the tapping roller 38 can come into and out of contact with the sheet S stacked on the internal tray 37.

The end fences 40L and 40R are arranged at the downstream end portion of the internal tray 37 in the second conveyance direction. The end fences 40L and 40R abut on the downstream end portion in the second conveyance direction of the sheet S stacked on the internal tray 37 to align the position of the sheet S in the second conveyance direction. The side fences 41L and 41R are arranged at both end portions in the main scanning direction of the sheet S stacked on the internal tray 37. The side fences 41L and 41R abut on both end portions in the main scanning direction of the sheet S stacked on the internal tray 37 to align the position of the sheet S in the main scanning direction. The side fences 41L and 41R move in the main scanning direction.

As an example, the side fences 41L and 41R move in the opposite direction in the main scanning direction (in other words, a position equidistant from the center of the internal tray 37 in the main scanning direction) to align the plurality of sheets S stacked on the internal tray 37 in the main scanning direction. As another example, the side fences 41L and 41R move in the same direction in the main scanning direction (in other words, a position deviated from the center of the internal tray 37 in the main scanning direction) to shift the plurality of sheets S stacked on the internal tray 37 in the main scanning direction.

The stapler 42 is disposed at a downstream end of the internal tray 37 in the second conveyance direction. The stapler 42 moves in the main scanning direction along the sheet bundle Sb stacked on the internal tray 37 by a driving force transmitted from a main scanning movement motor 43 (see FIG. 5). The stapler 42 moves between a home position illustrated in FIG. 3A and a position facing the binding position illustrated in FIG. 13. The home position is a position deviated to one side in the main scanning direction from the sheet S or the sheet bundle Sb stacked on the internal tray 37. The binding position is a position on the sheet bundle Sb stacked on the internal tray 37. However, the binding position is not limited to the position of FIG. 13, and may be any position on the sheet bundle Sb stacked on the internal tray 37 (for example, the position in FIG. 10).

Figure 4A:
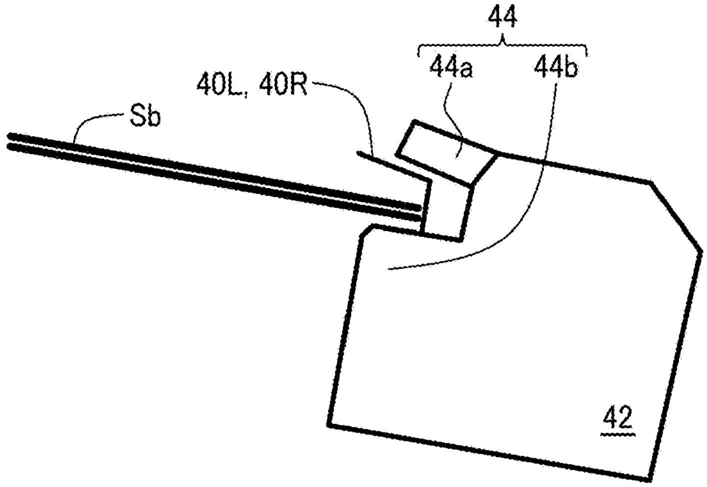
FIGS. 4A, 4B and 4C are views illustrating a state of a stapler.
Figure 4B:
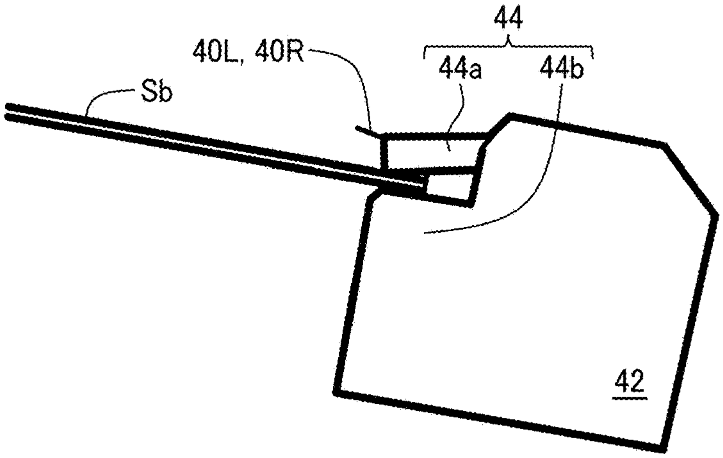
Figure 4C:
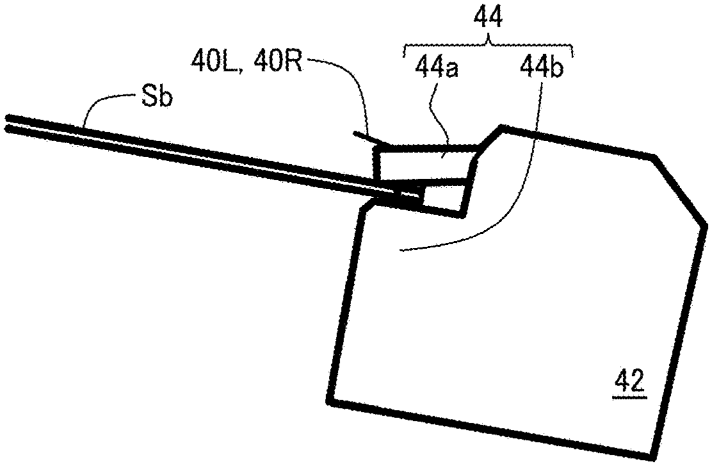

FIGS. 4A, 4B and 4C are views illustrating a state of a stapler 42. The stapler 42 executes so-called "stapling" in which a binding needle inserts into the sheet bundle Sb stacked on the internal tray 37 and binds the sheet bundle Sb. As illustrated in FIGS. 4A, 4B and 4C, the stapler 42 mainly includes a pair of clampers 44*a* and 44*b* and a binding motor 45 (see FIG. 5). The pair of clampers 44*a* and 44*b* is arranged to face each other with the sheet S stacked on the internal tray 37 interposed therebetween. Further, a binding needle loaded in a cartridge is set in the clamper 44*a*. Furthermore, the clamper 44*a* is brought into and out of contact with the clamper 44*b* (lifted and lowered) by a driving force transmitted from the binding motor 45.

As a result, the stapler 42 is switched among the out-of-contact state illustrated in FIG. 4A, the clamping state illustrated in FIG. 4B, and the binding state illustrated in FIG. 4C. More particularly, when the binding motor 45 rotates in the first direction, the stapler 42 switches from the out-of-contact state to the binding state via the clamping state. In addition, when the binding motor 45 rotates in the second direction opposite to the first direction, the stapler 42 switches from the binding state to the out-of-contact state via the clamping state.

The out-of-contact state illustrated in FIG. 4A is a state in which the pair of clampers 44*a* and 44*b* is out of contact with each other and can receive the sheet S. That is, when the stapler 42 is in the out-of-contact state, the sheet S conveyed in the second conveyance direction by the tapping rollers 38 can enter between the pair of clampers 44*a* and 44*b*. When the stapler 42 is in the out-of-contact state, the sheet S conveyed (ejected to the ejection tray 32) in the first conveyance direction by the conveyance roller pair 36 and the return roller 39 can be retracted from between the pair of clampers 44*a* and 44*b*.

The clamping state illustrated in FIG. 4B is a state in which the sheet S or the sheet bundle Sb stacked on the internal tray 37 is clamped by the pair of clampers 44*a* and 44*b*. That is, when the stapler 42 is in the clamping state, the pair of clampers 44*a* and 44*b* abuts on the front surface and the back surface of the sheet S or the sheet bundle Sb stacked on the internal tray 37. When the stapler 42 is in the clamping state, the sheet S conveyed in the second conveyance direction by the tapping roller 38 cannot enter between the pair of clampers 44*a* and 44*b*. Further, the sheet S stacked on the internal tray 37 cannot be retracted from between the pair of clampers 44*a* and 44*b* (that is, the sheet cannot move in the first conveyance direction). On the other hand, when the stapler 42 is in the clamping state, the binding needle set in the clamper 44*a* does not insert into the sheet bundle Sb (that is, no stapling is performed).

The binding state illustrated in FIG. 4C is a state in which the sheet S or the sheet bundle Sb stacked on the internal tray 37 is pressed and bound by the pair of clampers 44*a* and 44*b*. That is, when the stapler 42 is in the binding state, the pair of clampers 44*a* and 44*b* presses the sheet S or the sheet bundle Sb stacked on the internal tray 37 more strongly than in the clamping state. As a result, when the stapler 42 is in the binding state, the binding needle set in the clamper 44*a* inserts into the sheet S or the sheet bundle Sb to staple the sheet S or the sheet bundle Sb. Further, when the stapler 42 is in the binding state, the sheet S or the sheet bundle Sb cannot enter or retract from between the pair of clampers 44*a* and 44*b*.

Furthermore, as illustrated in FIGS. 3A and 3B, the binding case 31 is provided at a position facing the stapler 42 in the main scanning direction with a binding slit 31*a* for manual binding. The corner portion of the sheet bundle Sb inserted into the binding case 31 through the binding slit 31*a* can be manually bound by the stapler 42. The binding case 31 further includes guide walls 31*b* and 31*c* around the binding slit 31*a*. The guide walls 31*b* and 31*c* position the sheet bundle Sb to be manually bound (that is, the corner portion is inserted into the binding slit 31*a*).

Figure 5:
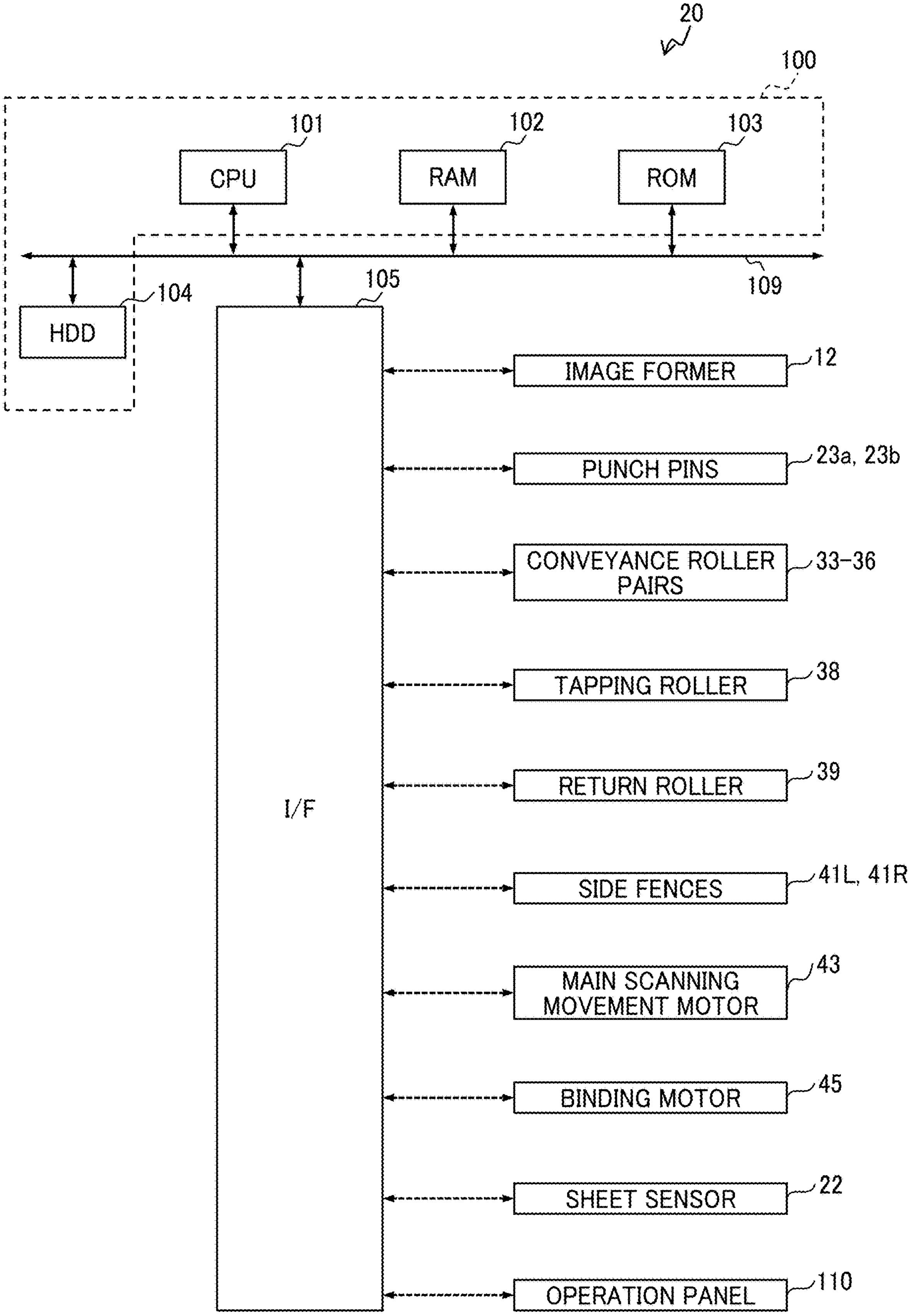
FIG. 5 is a block diagram illustrating a hardware configuration of the image forming apparatus.

FIG. 5 is a block diagram illustrating a hardware configuration of the image forming apparatus 10. As illustrated in FIG. 5, the image forming apparatus 10 has a configuration in which a central processing unit (CPU) 101, a random access memory (RAM) 102, a read only memory (ROM) 103, a hard disk drive (HDD) 104, and an interface (I/F) 105 are coupled to each other via a common bus 109.

The CPU 101 is an arithmetic unit and controls the overall operation of the image forming apparatus 10. The RAM 102 is a volatile storage medium that allows data to be read and written at high speed. The CPU 101 uses the RAM 102 as a work area for data process. The ROM 103 is a read-only non-volatile storage medium that stores programs such as firmware. The HDD 104 is a non-volatile storage medium that allows data to be read and written and has a relatively large storage capacity. The HDD 104 stores, for example, an operating system (OS), various control programs, and application programs.

By an arithmetic function of the CPU 101, the image forming apparatus 10 processes, for example, a control program stored in the ROM 103 and an information processing program (application program) loaded into the RAM 102 from a storage medium such as the HDD 104. Such process configures a software controller including various functional modules of the image forming apparatus 10. The software controller thus configured cooperates with hardware resources of the image forming apparatus 10 to construct functional blocks to implement functions of the image forming apparatus 10. In other words, the CPU 101, the RAM 102, the ROM 103, and the HDD 104 construct a controller 100 that controls the operation of the image forming apparatus 10.

The I/F 105 is an interface that connects the image former 12, the punch pins 23*a* and 23*b*, the conveyance roller pairs 33 to 36, the tapping roller 38, the return roller 39, the side fences 41L and 41R, the main scanning movement motor 43, the binding motor 45, the sheet sensor 22, and the operation panel 110 to the common bus 109. The controller 100 acquires various types of information from the sheet sensor 22 and the operation panel 110 through the I/F 105, and operates the image former 12, the punch pins 23*a* and 23*b*, the conveyance roller pairs 33 to 36, the tapping roller 38, the return roller 39, the side fences 41L and 41R, the main scanning movement motor 43, and the binding motor 45.

Note that the controller 100 illustrated in FIG. 5 collectively controls the image former 12, the punch hole drilling unit 20, and the binding unit 30. As another example, the image former 12, the punch hole drilling unit 20, and the binding unit 30 may be operated in conjunction with each other by mutual communication among a controller that controls the operation of the image former 12, a controller that controls the operation of the punch hole drilling unit 20, and a controller that controls the operation of the binding unit 30.

The operation panel 110 includes an operation device that receives instructions from a user and a display serving as a notifier that notifies the user of information. The operation device includes, for example, hard keys and a touch panel superimposed on a display. The operation panel 110 acquires information from the operator through the operation device and provides the operator with information through the display. The specific example of the notifier is not limited to the display and may be, for example, a light emitting diode (LED) lamp or a speaker.

Figure 6:
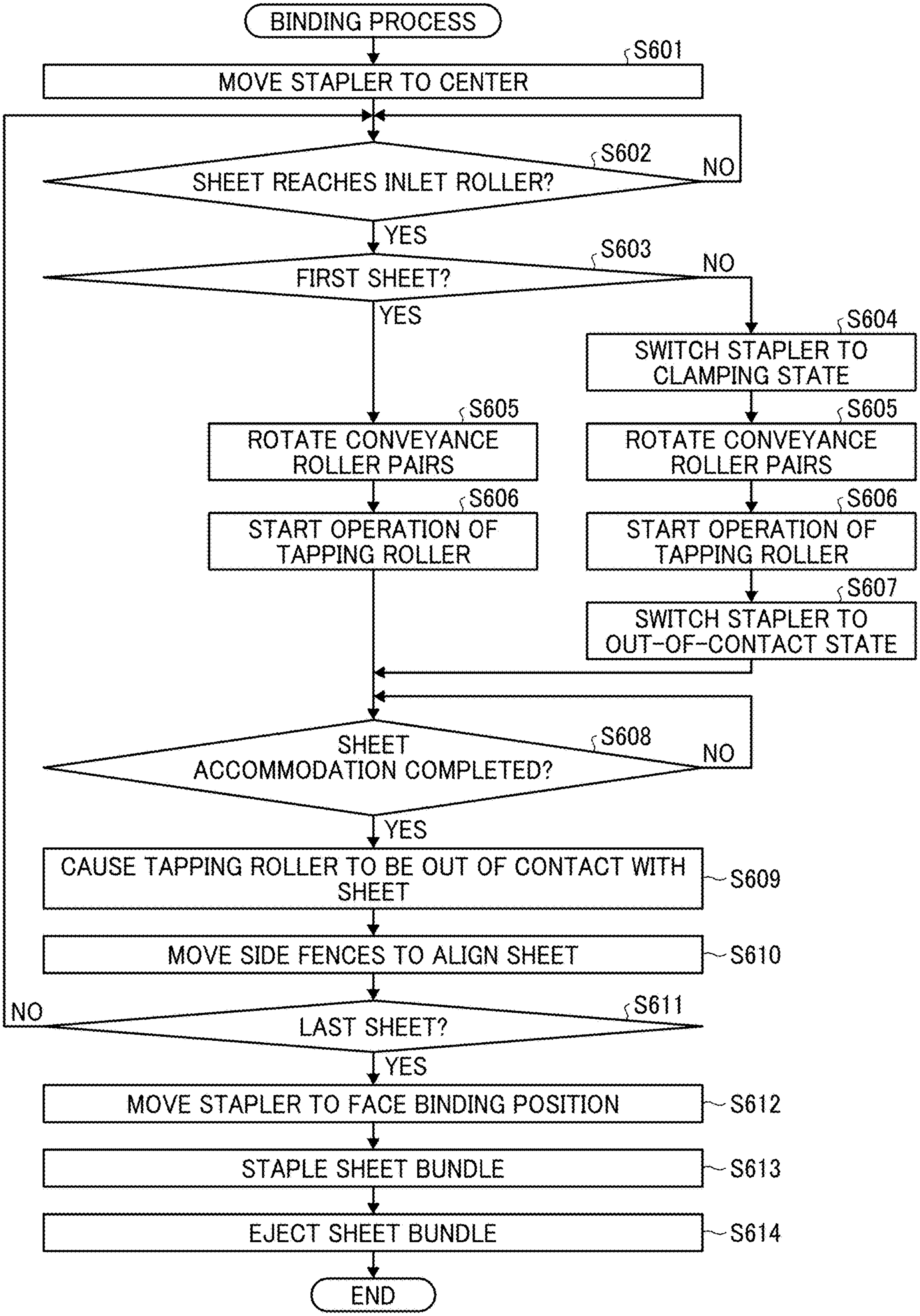
FIG. 6 is a flowchart of a binding process according to the present embodiment.
Figure 7:
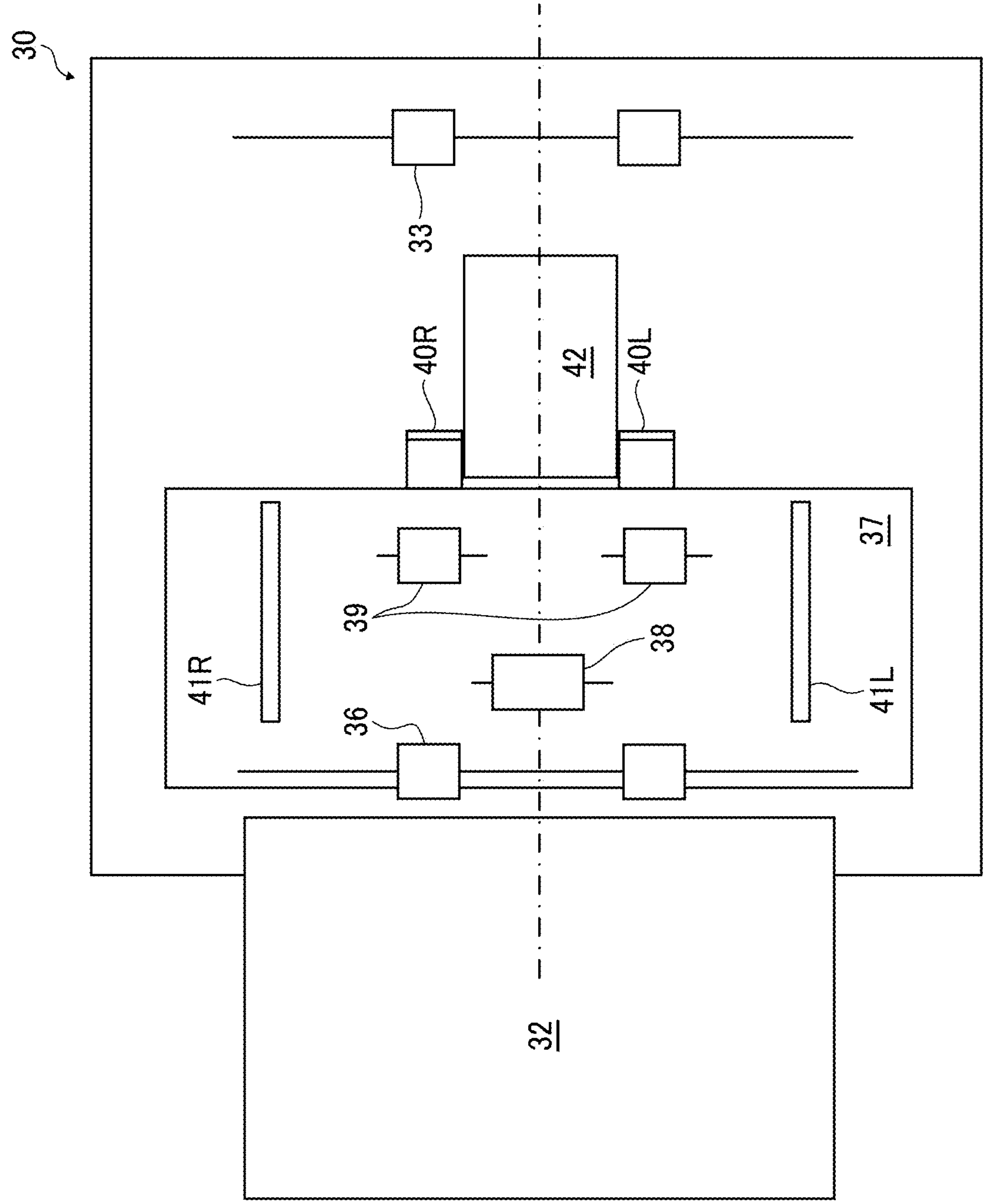
FIG. 7 is a plan view of a binding unit in step S601.
Figure 8A:
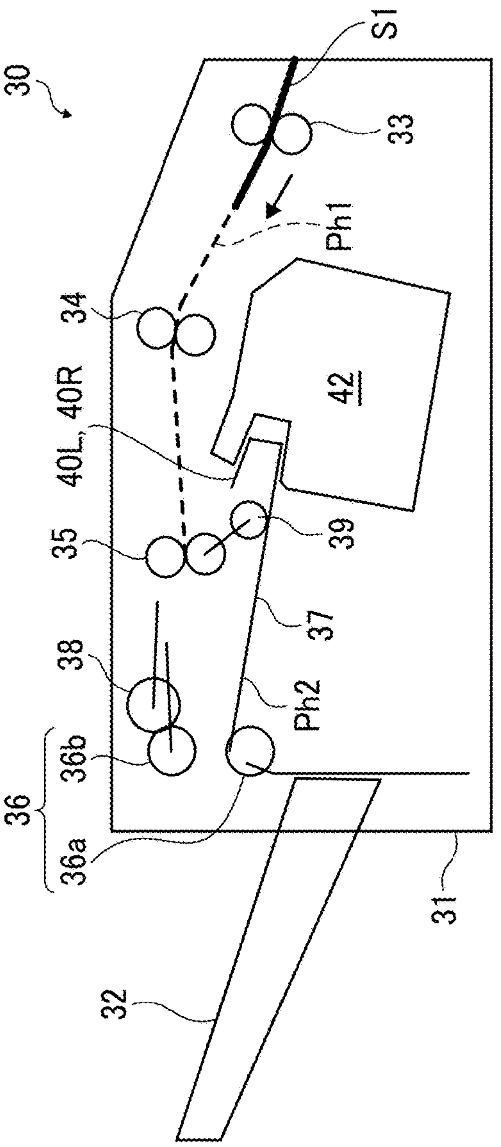
FIGS. 8A and 8B are side views of the binding unit until the leading end of the first sheet reaches the internal tray.
Figure 8B:
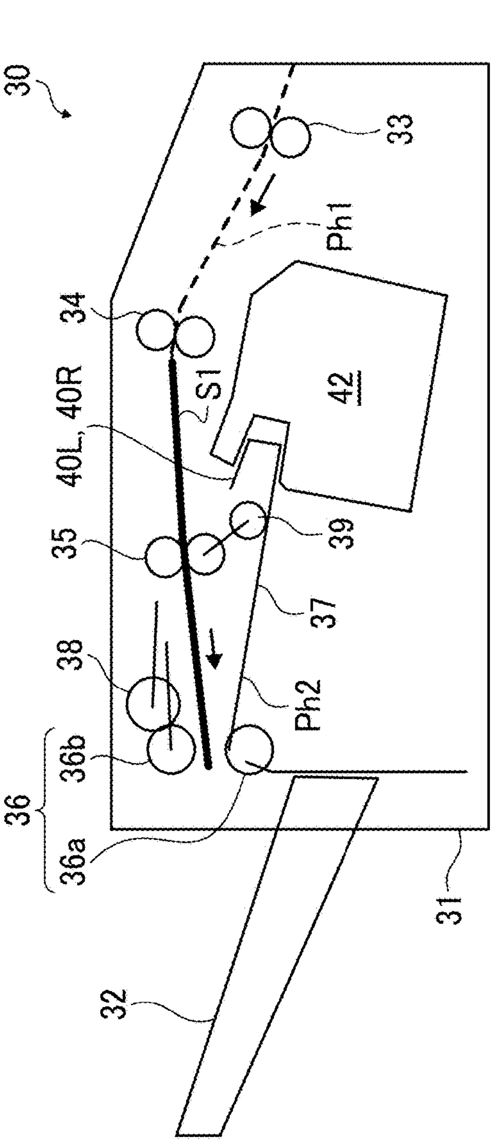
Figure 9A:
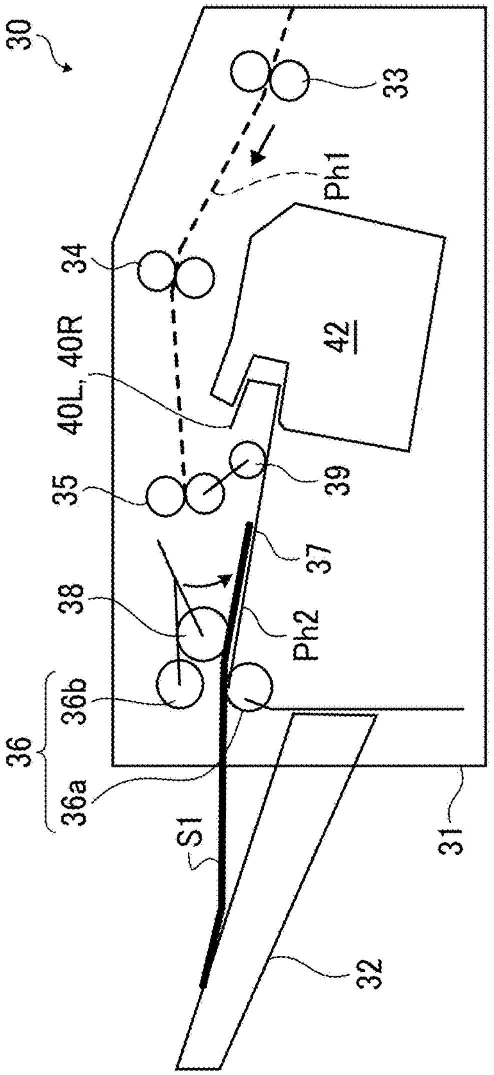
FIGS. 9A and 9B are side views illustrating processes of steps S606 to S608 for the first sheet.
Figure 9B:
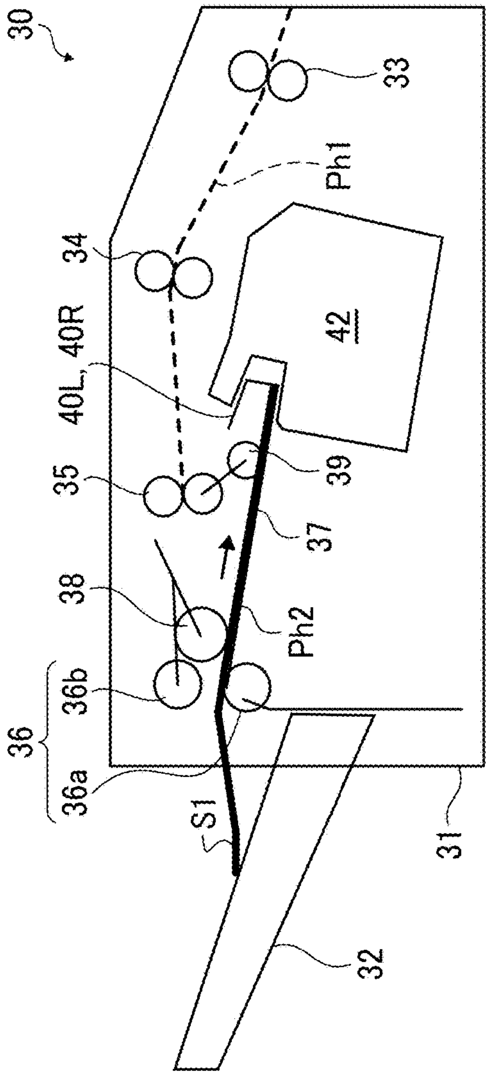
Figure 10:
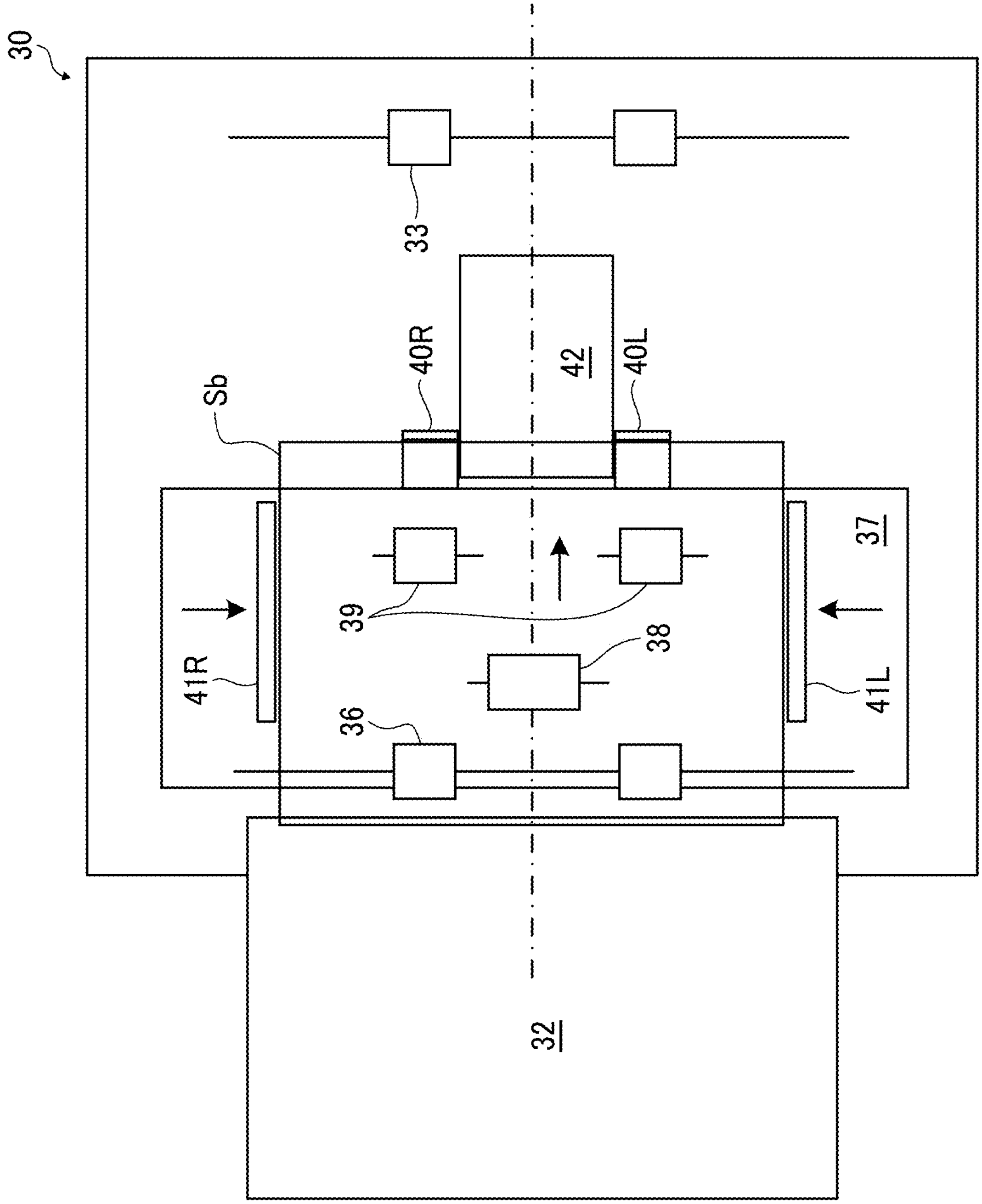
FIG. 10 is a plan view of the binding unit in step S610.
Figure 11A:
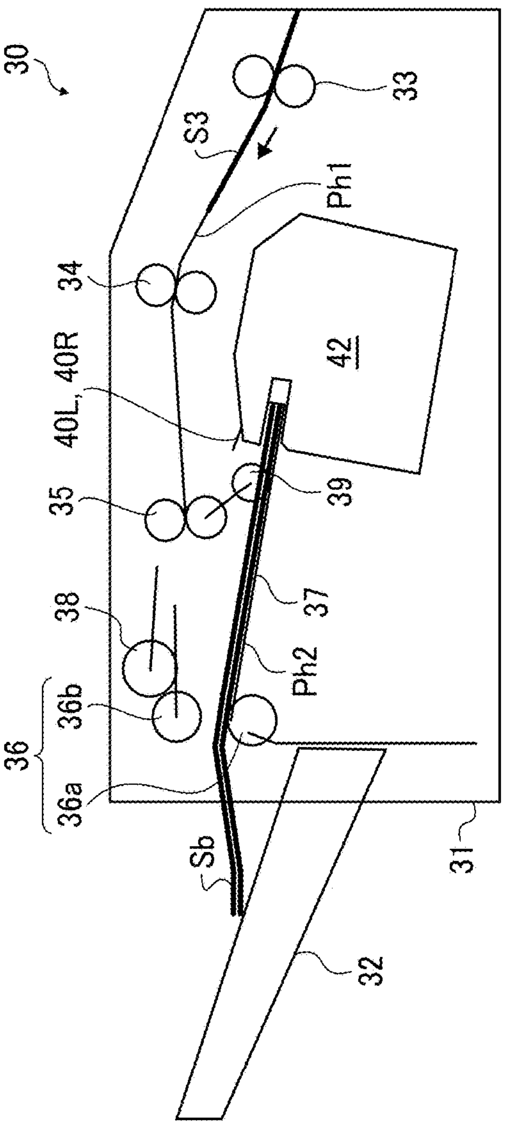
FIGS. 11A and 11B are side views of the binding unit until the leading end of the third sheet reaches the internal tray.
Figure 11B:
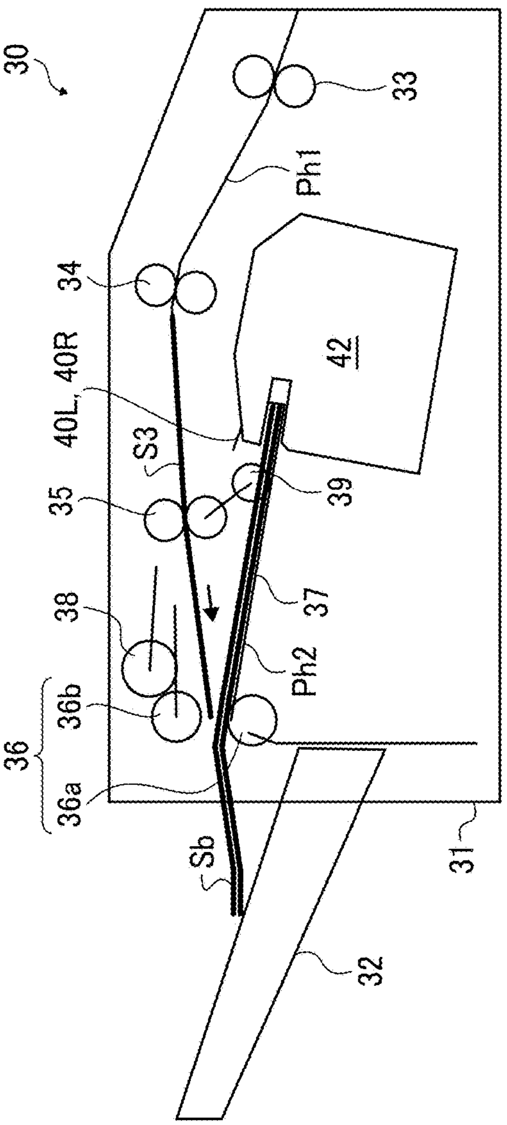
Figure 12A:
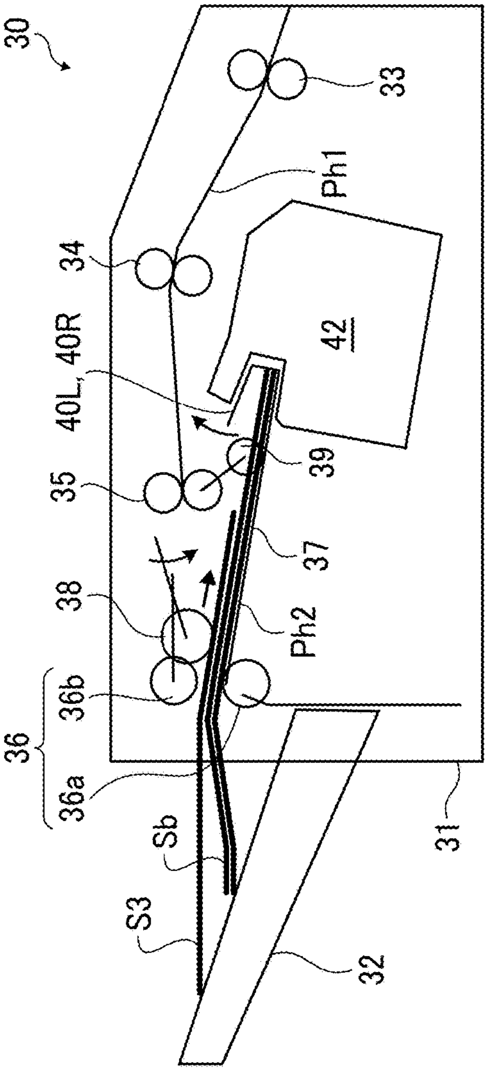
FIGS. 12A and 12B are side views illustrating processes of steps S606 to S608 for the third sheet.
Figure 12B:
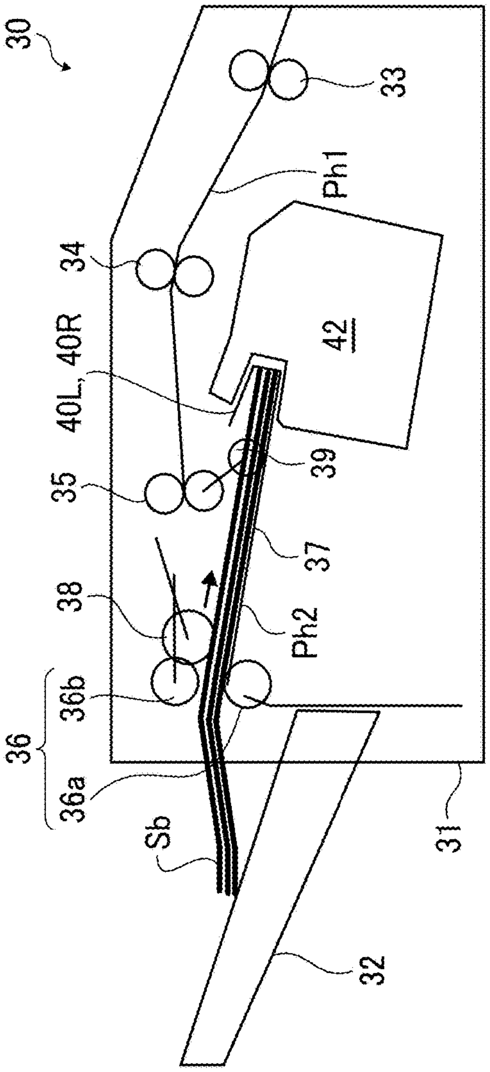
Figure 13:
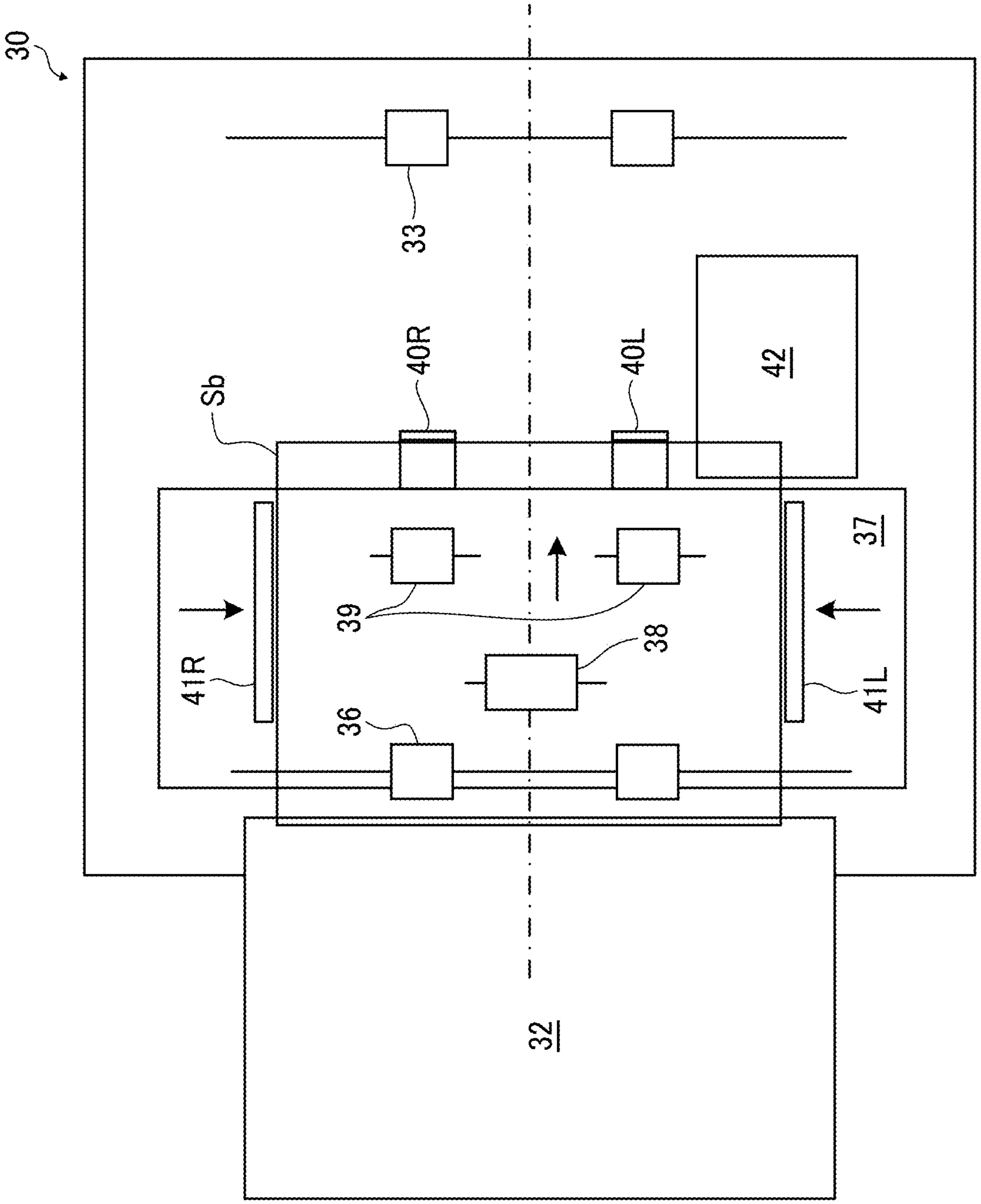
FIG. 13 is a plan view illustrating processes of step S613 for the sheet bundle.
Figure 14A:
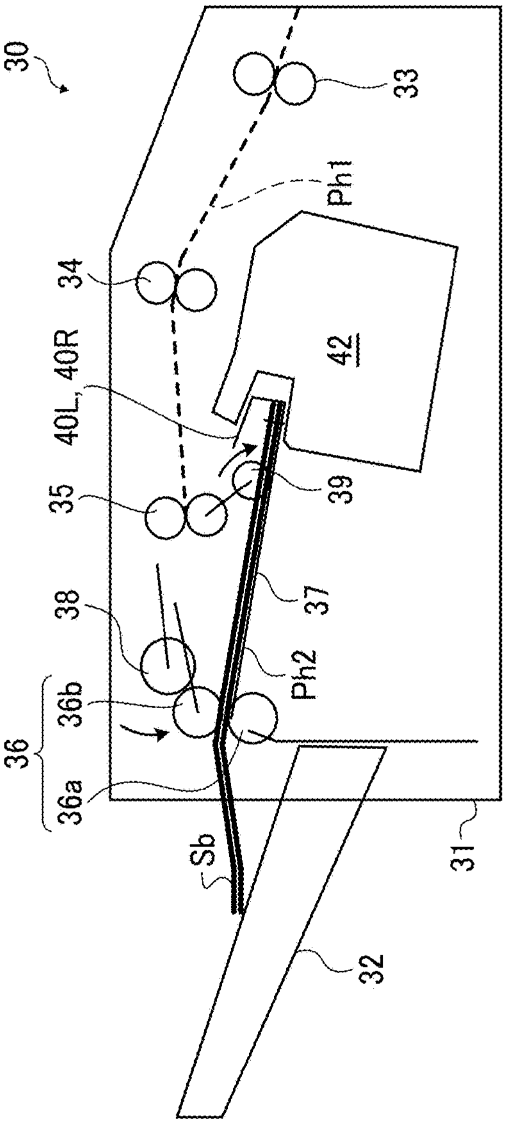
FIGS. 14A and 14B are side views illustrating processes of step S614 for the sheet bundle.
Figure 14B:
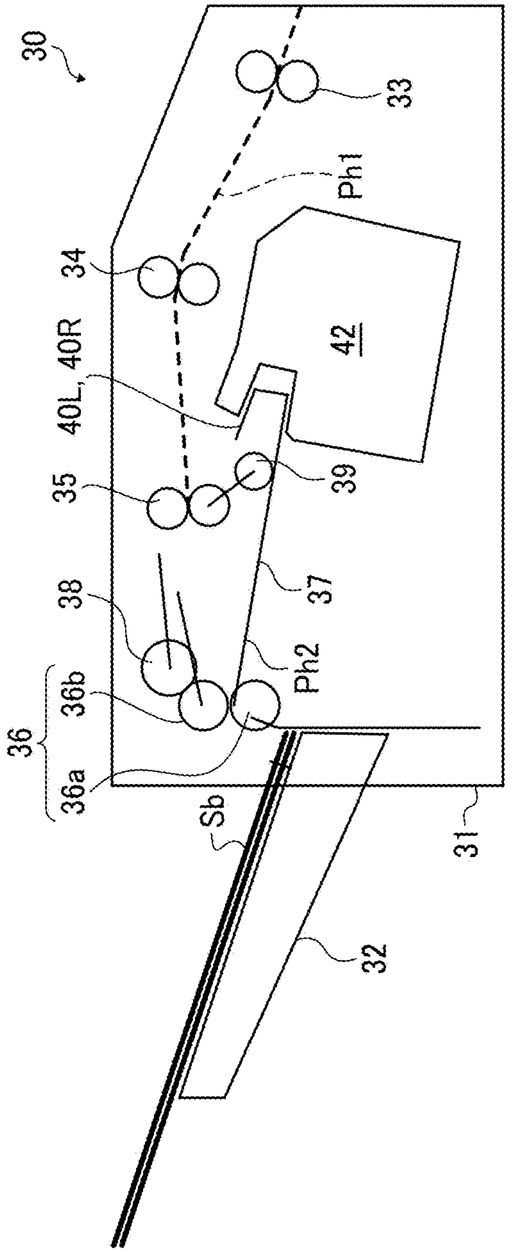

FIG. 6 is a flowchart of a binding process according to the present embodiment. FIG. 7 is a plan view of the binding unit 30 in step S601. FIGS. 8A and 8B are side views of the binding unit 30 until the leading end of the first sheet S1 reaches the internal tray 37. FIGS. 9A and 9B are side views illustrating process of steps S606 to S608 for the first sheet S1. FIG. 10 is a plan view of the binding unit 30 in step S610. FIGS. 11A and 11B are side views of the binding unit 30 until the leading end of the third sheet S3 reaches the internal tray 37. FIGS. 12A and 12B are side views illustrating process of steps S606 to S608 for the third sheet S3. FIG. 13 is a plan view illustrating process of step S613 for the sheet bundle Sb. FIGS. 14A and 14B are side views illustrating process of step S614 for the sheet bundle Sb.

In response to an input of an image forming instruction through the operation panel 110, the controller 100 causes the image former 12 to form an image on the sheet S, and outputs the sheet S on which the image is formed to the binding unit 30 through the punch hole drilling unit 20. More particularly, the controller 100 ejects the sheet S until the sheet S reaches the conveyance roller pair 33 (inlet roller) of the binding unit 30 through the punch hole drilling unit 20. The image forming instruction includes the number of sheets S on which an image is to be formed, and the binding position of the sheet bundle Sb. In the following description, the number of sheets S may be referred to as "given number". Therefore, the controller 100 sequentially forms an image on the given number of sheets S.

In response to the input of the image forming instruction, the controller 100 executes the binding process illustrated in FIG. 6 in parallel with the processes of the image former 12 and the punch hole drilling unit 20. At the start of the binding process, the driving roller 36*a* and the driven roller 36*b* are out of contact with each other, and the stapler 42 is disposed at the home position and in the out-of-contact state.

First, as illustrated in FIG. 7, the controller 100 drives the main scanning movement motor 43 to move the stapler 42 in the main scanning direction to allow the stapler 42 to face a position including the center of the sheet S or the sheet bundle Sb stacked on the internal tray 37 in the main scanning direction (step S601). The process of step S601 is executed before the first sheet S1 supplied from the image former 12 reaches the conveyance roller pair 33. Then, the controller 100 stands by to execute the process of and after step S603 until the leading end of the sheet S1 reaches the conveyance roller pair 33 (step S602: No)

Note that the controller 100 can specify the position of the stapler 42 in the main scanning direction by a position sensor that detects the position of the stapler 42, a rotary encoder of the main scanning movement motor 43, or a combination thereof.

Next, as illustrated in FIG. 8A, in response to the first sheet S1 reaching the conveyance roller pair 33 (step S602: Yes, and step S603: Yes), the controller 100 maintains the stapler 42 in the out-of-contact state of and rotates the conveyance roller pairs 33 to 36 (step S605). As a result, as illustrated in FIG. 8B, the sheet S1 is conveyed in the first conveyance direction along the conveying path Ph1.

Next, in response to the leading end of the sheet S1 reaching the internal tray 37 (in other words, the rear end of the sheet S1 passes through the conveyance roller pair 35), the controller 100 stops the conveyance roller pairs 33 to 36 and causes the tapping roller 38 to abut on the sheet S1 and rotates the tapping roller 38 (step S606). As a result, as illustrated in FIG. 9A, the sheet S1 is conveyed in the second conveyance direction along the conveying path Ph2. Then, as illustrated in FIG. 9B, the controller 100 stands by to execute the process of and after step S609 until the rear end of the sheet S1 reaches the end fences 40L and 40R (step S608: No).

Note that the controller 100 can specify the position of the sheet S on the conveying paths Ph1 and Ph2 by a sheet sensor that detects the sheet S in the binding unit 30, a rotary encoder of a motor that rotates the conveyance roller pairs 33 to 36 and the tapping roller 38, or a combination thereof.

Next, in response to the rear end of the sheet S1 reaching the end fences 40L and 40R (step S608: Yes), the controller 100 causes the tapping roller 38 to be out of contact with the sheet S1 (step S609). As illustrated in FIG. 10, the controller 100 moves the side fences 41L and 41R in the main scanning direction to position the sheet S1 accommodated on the internal tray 37 in the main scanning direction (step S610). Next, the controller 100 determines whether or not a given number of sheets S are accommodated on the internal tray 37 (step S611). When the controller 100 determines that the given number of sheets S are not accommodated on the internal tray 37 (step S611: No), the controller 100 executes the process of and after step S602 on the next sheet S. The following process will be described by taking the third sheet S3 as an example, and the same applies to all the sheets S after the second sheet S.

As illustrated in FIG. 11A, in response to the sheet S3 reaching the conveyance roller pairs 33 (step S602: Yes, and step S603: No), the controller 100 rotates the binding motor 45 in the first direction to switch the stapler 42 from the out-of-contact state to the clamping state (step S604), and rotates the conveyance roller pair 33 to 36 (step S605). As a result, as illustrated in FIG. 11B, the sheet S3 is conveyed in the first conveyance direction along the conveying path Ph1. When the rear end of the sheet S3 passes through the conveyance roller pair 35, the sheet S3 is stacked on the sheet S1 or the sheet bundle Sb already stacked on the internal tray 37.

At this time, the sheet S3 falls onto the internal tray 37 while moving in the first conveyance direction by the inertial force due to the conveyance of the conveyance roller pair 35. Therefore, when the sheet S3 is stacked on the sheet S1 or the sheet bundle Sb, the sheet S3 attempts to move the sheet S1 or the sheet bundle Sb in the first conveyance direction. However, since the stapler 42 in the clamping state clamps the sheet S1 or the sheet bundle Sb, the movement of the sheet S1 or the sheet bundle Sb in the first conveyance direction is prevented. That is, in a state where N sheets S are stacked on the internal tray 37, when the (N+1)-th sheet S is conveyed in the first conveyance direction while being in contact with the N-th sheet S, the controller 100 switches the stapler 42 to the clamping state.

Next, in response to the leading end of the sheet S3 reaching the internal tray 37 (in other words, the rear end of the sheet S3 passes through the conveyance roller pairs 35), the controller 100 stops the conveyance roller pairs 33 to 36 and causes the tapping roller 38 to abut on the sheet S3 and rotates the tapping roller 38 as illustrated in FIG. 12A (step S606). In addition, the controller 100 rotates the binding motor 45 in the second direction after the sheet S3 reaches the internal tray 37 and before the sheet S3 reaches the end fences 40L and 40R to switch the stapler 42 from the clamping position to the out-of-contact position (step S607).

Next, as illustrated in FIG. 12B, in response to the rear end of the sheet S3 reaching the end fences 40L and 40R (step S608: Yes), the controller 100 causes the tapping roller 38 to be out of contact with the sheet S3 (step S609). The controller 100 moves the side fences 41L and 41R in the main scanning direction to align the position of the sheet bundle Sb stacked on the internal tray 37 in the main scanning direction (step S610). As a result, the positions of the plurality of sheets S1 to S3 of the sheet bundle Sb in the second conveyance direction and the main scanning direction are aligned.

Next, when the controller 100 determines that the given number of sheets S have been accommodated on the internal tray 37 (step S611: Yes), the controller 100 drives the main scanning movement motor 43 to move the stapler 42 to a position facing the binding position of the sheet bundle Sb stacked on the internal tray 37 as illustrated in FIG. 13 (step S612). Next, the controller 100 rotates the binding motor 45 in the first direction to switch the stapler 42 from the out-of-contact state to the binding state (step S613). Accordingly, the sheet bundle Sb is stapled at the binding position. Further, the controller 100 rotates the binding motor 45 in the second direction to switch the stapler 42 from the binding state to the out-of-contact state.

Next, as illustrated in FIG. 14A, the controller 100 causes the return roller 39 to abut on the stapled sheet bundle Sb and rotates the return roller 39, thereby causing the sheet bundle Sb to enter between the driving roller 36*a* and the driven roller 36*b*. Further, the controller 100 causes the driving roller 36*a* and the driven roller 36*b* to clamp the sheet bundle Sb. Further, as illustrated in FIG. 14B, the controller 100 rotates the conveyance roller pair 36 to eject the sheet bundle Sb to the ejection tray 32 (step S614).

According to the above-described embodiments of the present disclosure, for example, the following operational effects can be obtained.

In the related art, when new sheets of paper are conveyed to an internal tray by a first conveyor in a state where sheets of paper are already stacked on the internal tray, the sheets of paper on the internal tray may be shifted in a conveyance direction due to friction of the sheets of paper. As a result, a plurality of sheets of paper stacked with shifted may be bound by the binder, with the sheets being shifted in the conveyance direction.

According to the above embodiment, when the subsequent sheet S is to be stacked on the internal tray 37, by switching the stapler 42 to the clamping state, the sheet S already stacked on the internal tray 37 can be prevented from being shifted in the first conveyance direction. As a result, the plurality of sheets S of the sheet bundle Sb can be aligned and bound in the conveyance direction. Here, the sheet S already stacked on the internal tray 37 is an example of an Nth sheet, and the subsequent sheet S is an example of an (N+1) th sheet. Here, N is a natural number.

In addition, according to the above embodiment, by clamping the center of the sheet S or the sheet bundle Sb stacked on the internal tray 37 in the conveyance direction by the stapler 42, the sheet S or the sheet bundle Sb can be prevented from being skewed when the subsequent sheet S is stacked.

Further, according to the above embodiment, by moving the stapler 42 to the center before the first sheet S1 reaches the internal tray 37 (step S601), the productivity of the binding process is improved as compared with the case where the stapler 42 is moved after the first sheet S1 reaches the internal tray 37.

Modification 1

Figure 15:
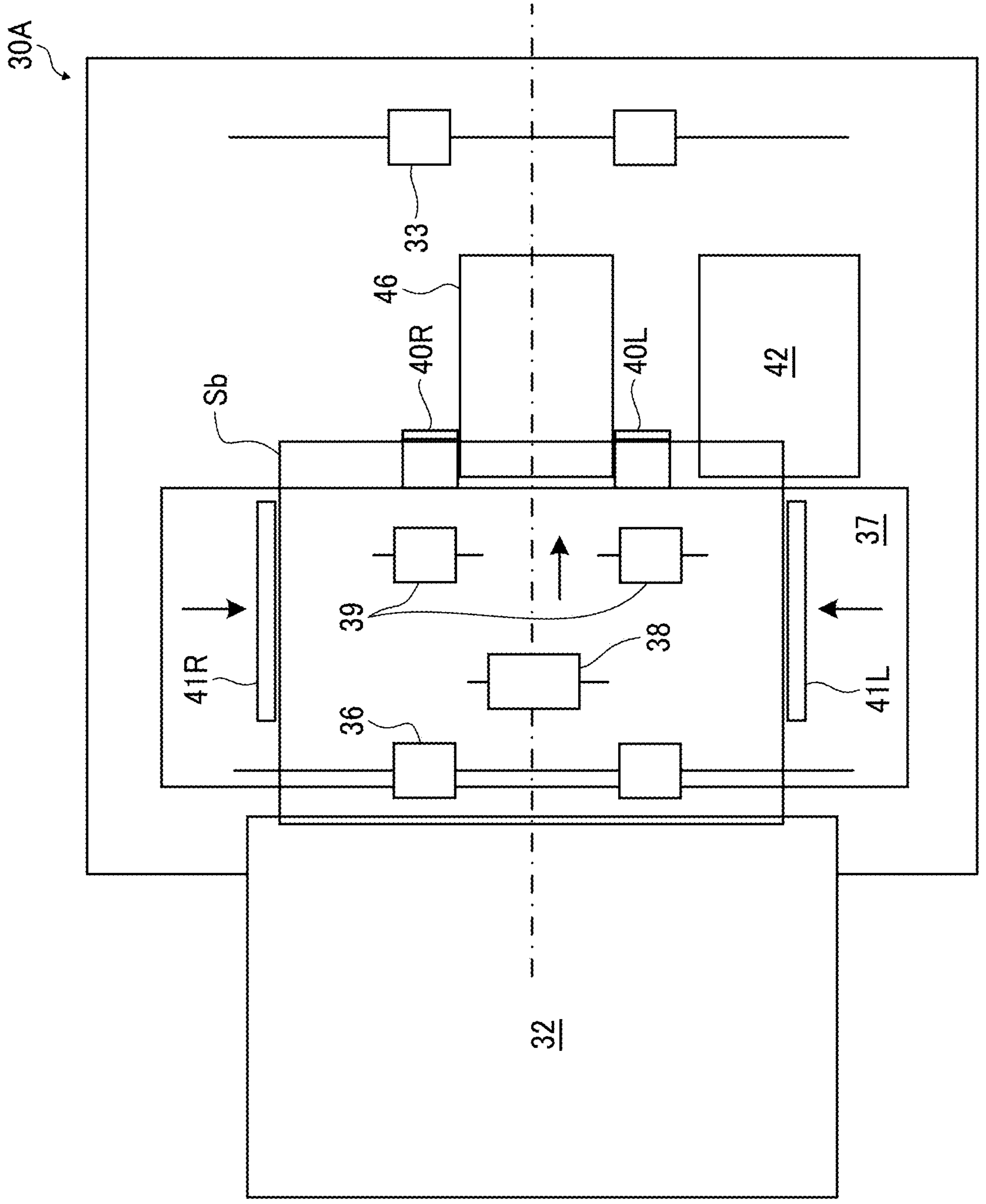
FIG. 15 is a plan view of a binding unit according to Modification 1.

Next, a binding unit 30A according to Modification 1 will be described with reference to FIGS. 15 to 17. FIG. 15 is a plan view of a binding unit 30A according to Modification 1. FIGS. 16A to 16D are diagrams illustrating a state of the crimping binder 46. FIG. 17 is a flowchart of a binding process according to Modification 1. Detailed description may be omitted of common features of the above-described embodiments and the present modification. The following description is focused on the differences between the above-described embodiments and the present modification. As illustrated in FIG. 15, a binding unit 30A according to Modification 1 is different from the binding unit 30 according to the above embodiment in further including a crimping binder 46.

The crimping binder 46 is disposed at a downstream end of the internal tray 37 in the second conveyance direction. Further, the crimping binder 46 moves in the main scanning direction along the sheet bundle Sb stacked on the internal tray 37 by a driving force transmitted from a main scanning movement motor. The stapler 42 and the crimping binder 46 can move in the main scanning direction independently of each other. Further, the crimping binder 46 moves between a home position and a position facing the binding position of the sheet bundle Sb. The home position of the crimping binder 46 is a position deviated to the other side in the main scanning direction from the sheet S or the sheet bundle Sb stacked on the internal tray 37.

The crimping binder 46 executes so-called "crimp binding" in which the sheet bundle Sb stacked on the internal tray 37 is pressure-deformed and bound. As illustrated in FIGS. 16A to 16D, the crimping binder 46 mainly includes a pair of binding teeth 47*a* and 47*b* serving as a pair of clampers, a pair of auxiliary members 48*a* and 48*b*, and a binding motor.

The pair of binding teeth 47*a* and 47*b* is disposed to face each with the sheet S stacked on the internal tray 37 interposed therebetween. Further, the pair of binding teeth 47*a* and 47*b* has an uneven shape that meshes with each other. Further, the binding teeth 47*a* are brought into and out of contact with the binding teeth 47*b* (lifted and lowered) by a driving force transmitted from the binding motor. The crimp binding is a process of binding the fibers of the plurality of sheets S by clamping the sheet bundle Sb between the pair of binding teeth 47*a* and 47*b* from both sides in the thickness direction.

The crimping binder 46 switches among the out-of-contact state (FIG. 16A) in which the pair of binding teeth 47*a* and 47*b* is out of contact, the clamping state (FIG. 16C) in which the sheet bundle Sb is clamped between the pair of binding teeth 47*a* and 47*b*, and the binding state (FIG. 16D) in which the sheet bundle Sb is bound between the pair of binding teeth 47*a* and 47*b*. The definitions of the out-of-contact state, the clamping state, and the binding state are the same as those of the above embodiment except that the stapling and the crimp binding are different.

The pair of auxiliary members 48*a* and 48*b* is disposed to face each other with the sheet S stacked on the internal tray 37 interposed therebetween. The pair of auxiliary members 48*a* and 48*b* is formed of a flat elastic member (for example, a leaf spring). Further, the auxiliary member 48*a* moves up and down together with the binding teeth 47*a* to come into and out of contact with the auxiliary member 48*b*.

More particularly, the pair of auxiliary members 48*a* and 48*b* clamps the sheet bundle Sb before the pair of binding teeth 47*a* and 47*b* meshes with each other. In addition, the pair of auxiliary members 48*a* and 48*b* elastically deforms to maintain a state in which the sheet bundle Sb is clamped until the pair of binding teeth 47*a* and 47*b* meshes with each other. Further, the pair of auxiliary members 48*a* and 48*b* is out of contact with the sheet bundle Sb after the pair of binding teeth 47*a* and 47*b* is out of contact with the sheet bundle Sb. As a result, the pair of auxiliary members 48*a* and 48*b* assists the pair of binding teeth 47*a* and 47*b* to be out of contact with the sheet bundle Sb after crimp binding.

Figure 16A:
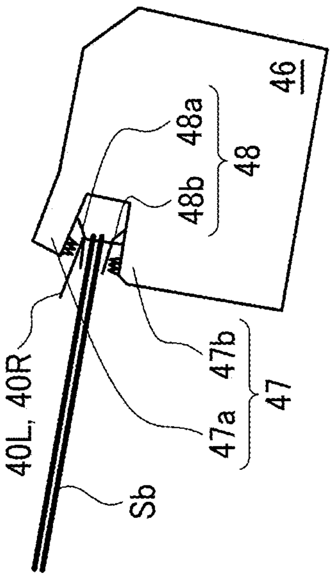
FIGS. 16A to 16D are views illustrating a state of a crimping binder.
Figure 16B:
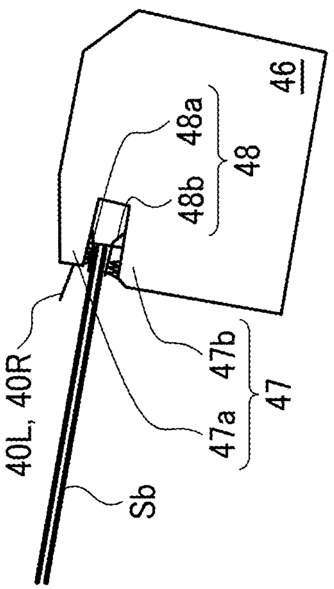
Figure 16C:
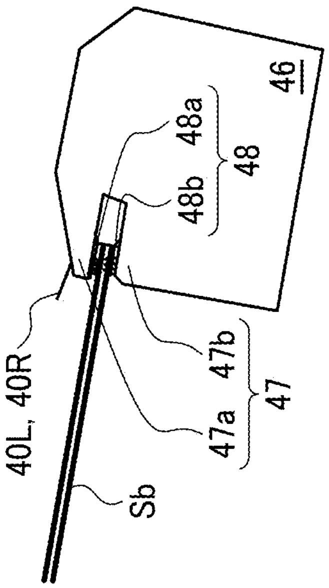
Figure 16D:
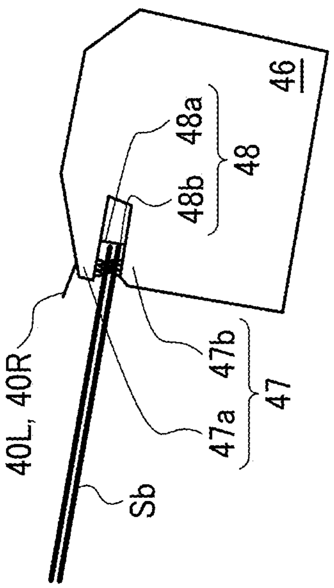
Figure 17:
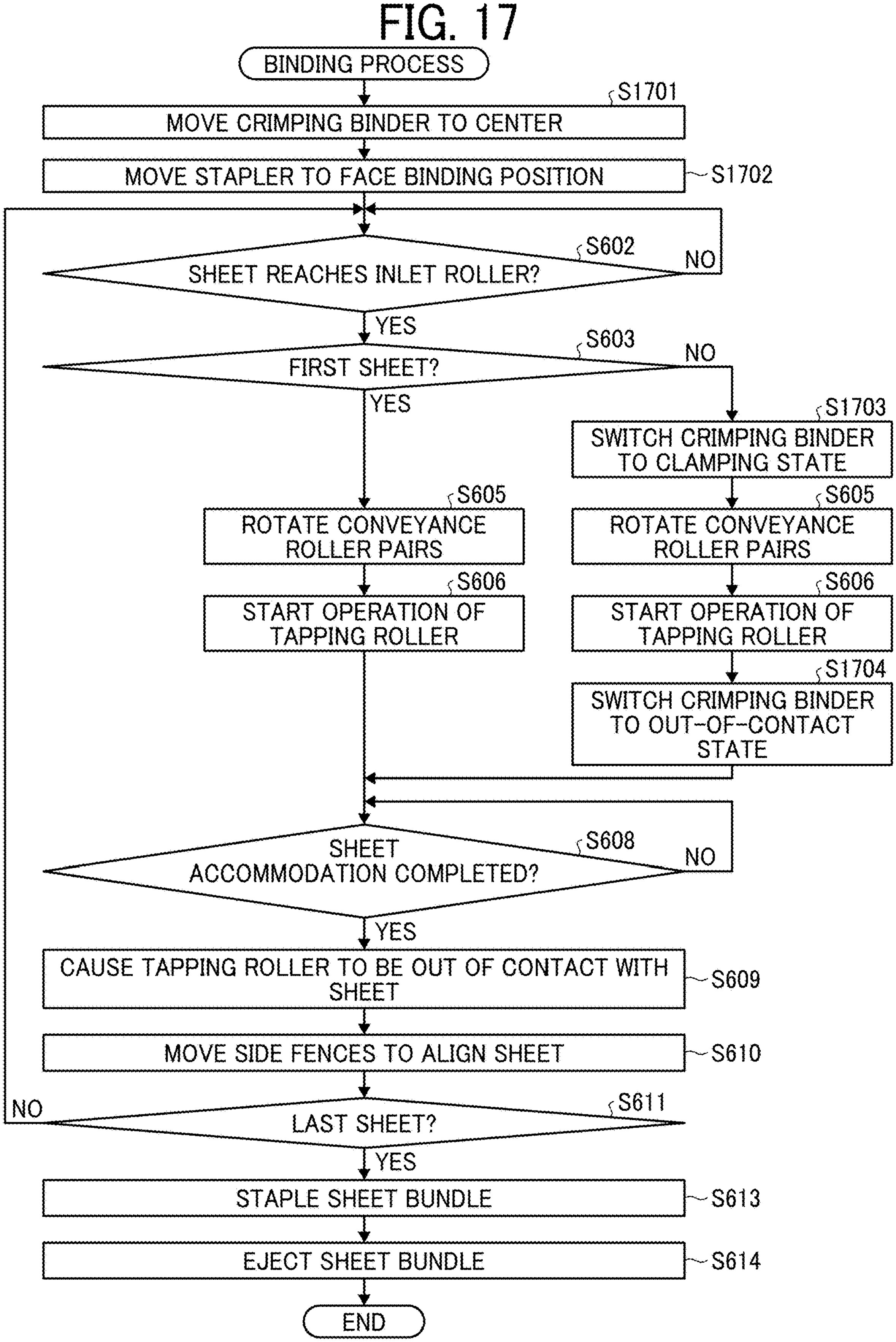
FIG. 17 is a flowchart of a binding process according to Modification 1.

Then, the crimping binder 46 including the auxiliary members 48*a* and 48*b* switches between a first clamping state illustrated in FIG. 16C and a second clamping state illustrated in FIG. 16B, which are the clamping state. The first clamping state is a state in which the sheet S or the sheet bundle Sb stacked on the internal tray 37 is clamped by both the pair of binding teeth 47*a* and 47*b* and the pair of auxiliary members 48*a* and 48*b*. The second clamping state is a state in which the sheet S or the sheet bundle Sb stacked on the internal tray 37 is clamped only by the pair of auxiliary members 48*a* and 48*b* out of the pair of binding teeth 47*a* and 47*b* and the pair of auxiliary members 48*a* and 48*b*.

When the binding motor rotates in the first direction, the crimping binder 46 switches the out-of-contact state to the binding state via the second clamping state and the first clamping state. In addition, when the binding motor rotates in a second direction opposite to the first direction, the crimping binder 46 switches from the binding state to the out-of-contact state via the first clamping state and the second clamping state.

As illustrated in FIG. 17, the controller 100 according to Modification 1 executes processes of steps S1701 and S1702 instead of step S601 of FIG. 6. In addition, the controller 100 according to Modification 1 executes processes of steps S1703 and S1704 instead of steps S604 and S607 of FIG. 6. Furthermore, in the binding process according to Modification 1, the process of step S612 in FIG. 6 is omitted. On the other hand, the processes of steps S602, S603, S605, S606, S608, S609, S610, S611, S613, and S614 are common to FIGS. 6 and 17.

First, as illustrated in FIG. 15, the controller 100 moves the crimping binder 46 in the main scanning direction to allow the crimping binder 46 to face the center of the sheet S or the sheet bundle Sb stacked on the internal tray 37 in the main scanning direction (step S1701). In addition, the controller 100 moves the stapler 42 in the main scanning direction to allow the stapler 42 to face the binding position of the sheet S or the sheet bundle Sb stacked on the internal tray 37 (step S1702). Note that the processes of steps S1701 and S1702 are executed before the first sheet S1 supplied from the image former 12 reaches the conveyance roller pair 33.

Next, in response to the first sheet S reaching the conveyance roller pair 33, the controller 100 maintains the crimping binder 46 in the out-of-contact state (step S602: Yes, and S603: Yes). In addition, in response to the second and subsequent sheets S reaching the conveyance roller pair 33, the controller 100 switches the crimping binder 46 from the out-of-contact state to the clamping state (step S602: Yes, and S603: No) (step S1703). Further, after the second and subsequent sheets S reach the internal tray 37 and before the second and subsequent sheets S reach the end fences 40L and 40R, the controller 100 switches the crimping binder 46 from the clamping position to the out-of-contact position (step S1704).

According to Modification 1, the same operation and effect as those of the above embodiment can be obtained. In addition, according to Modification 1, since the process of step S612 of FIG. 6 can be omitted, productivity can be further improved as compared with the above embodiment.

Note that, in FIG. 17, an example has been described in which the sheet S or the sheet bundle Sb is clamped by the crimping binder 46 and the sheet bundle Sb is stapled by the stapler 42, and the roles of the stapler 42 and the crimping binder 46 may be reversed. That is, when the (N+1)-th sheet S is conveyed in the first conveyance direction while being in contact with the N-th sheet S, the controller 100 may switch one of the stapler 42 or the crimping binder 46 into the clamping state. Further, in response to the sheet bundle Sb being stacked on the internal tray 37, the controller 100 may cause the other of the stapler 42 or the crimping binder 46 to bind the sheet bundle Sb.

Further, the crimping binder 46 in the first clamping state can firmly clamp the sheet S or the sheet bundle Sb as compared with the crimping binder 46 in the second clamping state. On the other hand, since the crimping binder 46 in the first clamping state clamps the sheet S or the sheet bundle Sb with the binding teeth 47*a* and 47*b* having the uneven shape, there is a possibility that a mark remains on the sheet S or the sheet bundle Sb. On the other hand, since the crimping binder 46 in the second clamping state clamps the sheet S or the sheet bundle Sb with the flat auxiliary members 48*a* and 48*b*, no mark remains on the sheet S or the sheet bundle Sb.

Therefore, in a case where the crimping binder 46 is disposed at the binding position of the sheet bundle Sb, the controller 100 may switch the crimping binder 46 to the first clamping state in step S1703. As described above, in a case where the sheet S or the sheet bundle Sb is clamped at the binding position where the mark is allowed to remain, the sheet S or the sheet bundle Sb can be firmly clamped by switching the crimping binder 46 into the first clamping state.

On the other hand, in a case where the crimping binder 46 is disposed at a position different from the binding position of the sheet bundle Sb, the controller 100 may switch the crimping binder 46 to the second clamping state in step S1703. In this manner, in a case where the sheet S or the sheet bundle Sb is clamped at a position different from the binding position, a mark can be prevented from remaining on the surface of the sheet S or the sheet bundle Sb by switching the crimping binder 46 into the second clamping state.

Modification 2

Figure 18:
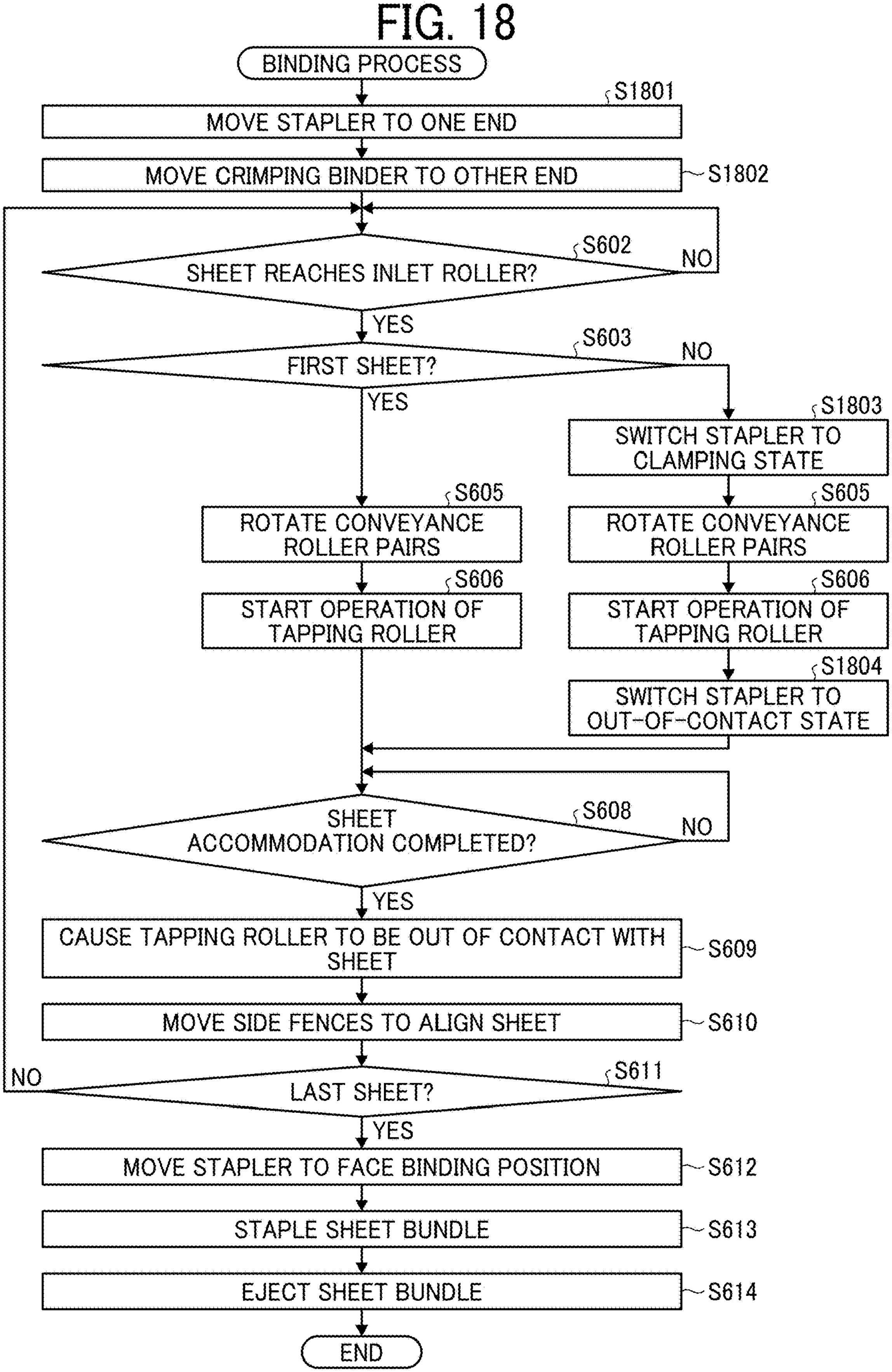
FIG. 18 is a flowchart of a binding process according to Modification 2.
Figure 19:
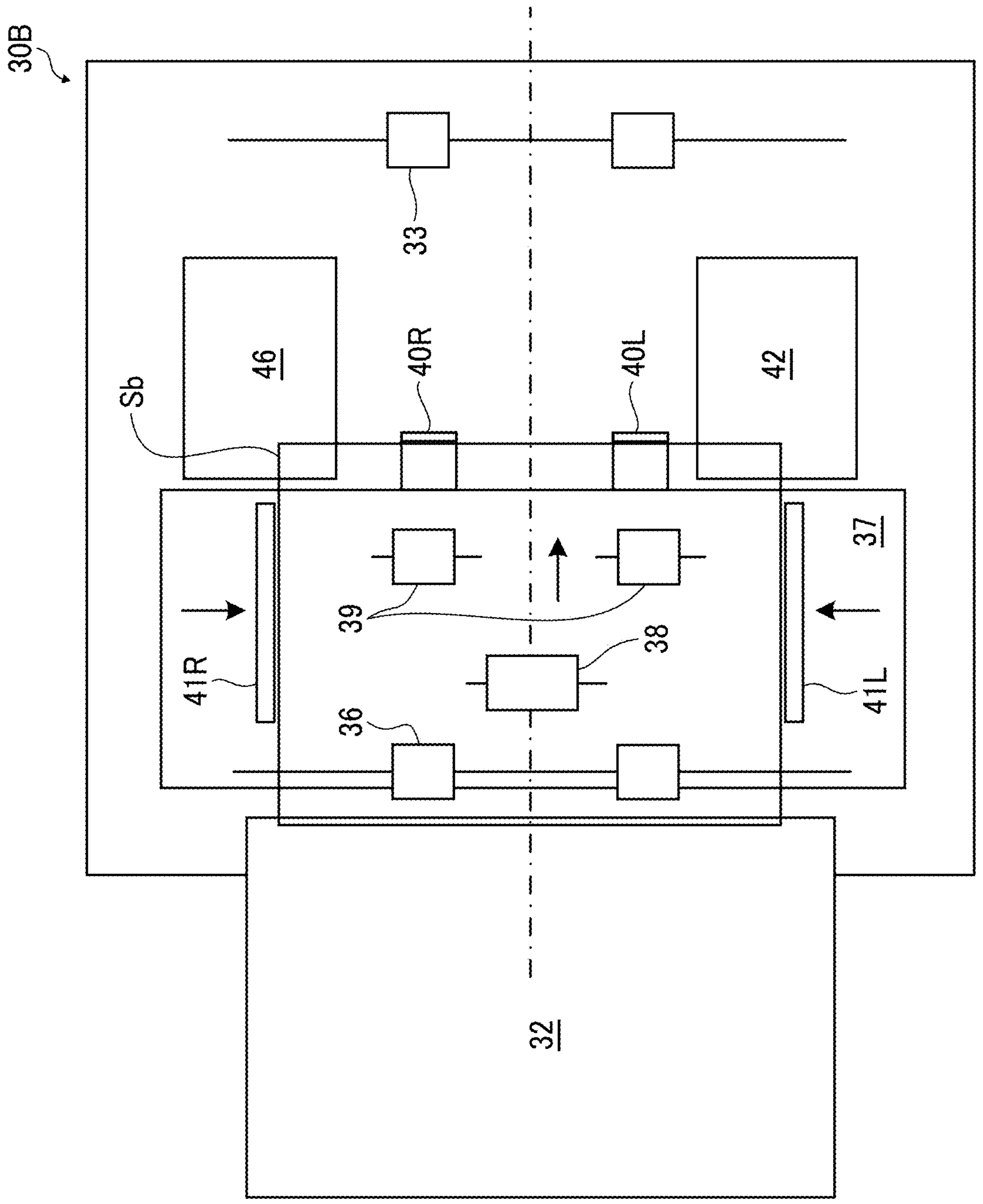
FIG. 19 is a plan view of a binding unit according to Modification 2.

Next, a binding unit 30A according to Modification 2 will be described with reference to FIGS. 18 and 19. FIG. 18 is a flowchart of a binding process according to Modification 2. FIG. 19 is a plan view of a binding unit 30B according to Modification 2. Note that detailed description of points common to the above-described embodiment and Modification 1 will be omitted, and differences will be mainly described. The configuration of the binding unit 30A according to Modification 2 is the same as that of Modification 1.

As illustrated in FIG. 18, the controller 100 according to Modification 2 executes processes of steps S1801 and S1802 instead of steps S1701 and S1702 of FIG. 17. In addition, the controller 100 according to Modification 2 executes processes of steps S1803 and S1804 instead of steps S1703 and S1704 of FIG. 17. Furthermore, in the binding process according to Modification 2, the process of step S612 is executed. On the other hand, the processes of steps S602, S603, S605, S606, and S608 to S614 are common to FIGS. 6 and 17.

As illustrated in FIG. 19, the controller 100 moves the stapler 42 to a position facing one end in the main scanning direction of the sheet S or the sheet bundle Sb stacked on the internal tray 37 (step S1801). Further, the controller 100 moves the crimping binder 46 to a position facing the other end in the main scanning direction of the sheet S or the sheet bundle Sb stacked on the internal tray 37 (step S1802). That is, the controller 100 causes the stapler 42 and the crimping binder 46 to face a position separated in the main scanning direction of the sheet S or the sheet bundle Sb.

Next, in response to the first sheet S reaching the conveyance roller pair 33, the controller 100 maintains the stapler 42 and the crimping binder 46 in the out-of-contact state (step S602: Yes, and S603: Yes). In addition, in response to the second and subsequent sheets S reaching the conveyance roller pair 33, the controller 100 switches both the stapler 42 and the crimping binder 46 from the out-of-contact state to the clamping state (step S602: Yes, and S603: No) (step S1803). Further, after the second and subsequent sheets S reach the internal tray 37 and before the second and subsequent sheets S reach the end fences 40L and 40R, the controller 100 switches both the stapler 42 and the crimping binder 46 from the clamping position to the out-of-contact position (step S1804).

Further, in a case where the controller 100 determines that the given number of sheets S have been accommodated on the internal tray 37 (step S611: Yes), the controller 100 causes the stapler 42 to face the binding position (step S612) and executes the stapling (step S613). As another example, in a case where the controller 100 determines that the given number of sheets S are accommodated on the internal tray 37 (step S611: Yes), the controller 100 may cause the crimping binder 46 to face the binding position (step S612) and execute the crimp binding (step S613).

According to Modification 2, by clamping the position of the sheets S or the sheet bundle Sb stacked on the internal tray 37 separated in the main scanning direction by the stapler 42 and the crimping binder 46, the sheets S or the sheet bundle Sb can be prevented from being skewed when the subsequent sheet S is stacked.

Modification 3

Figure 20:
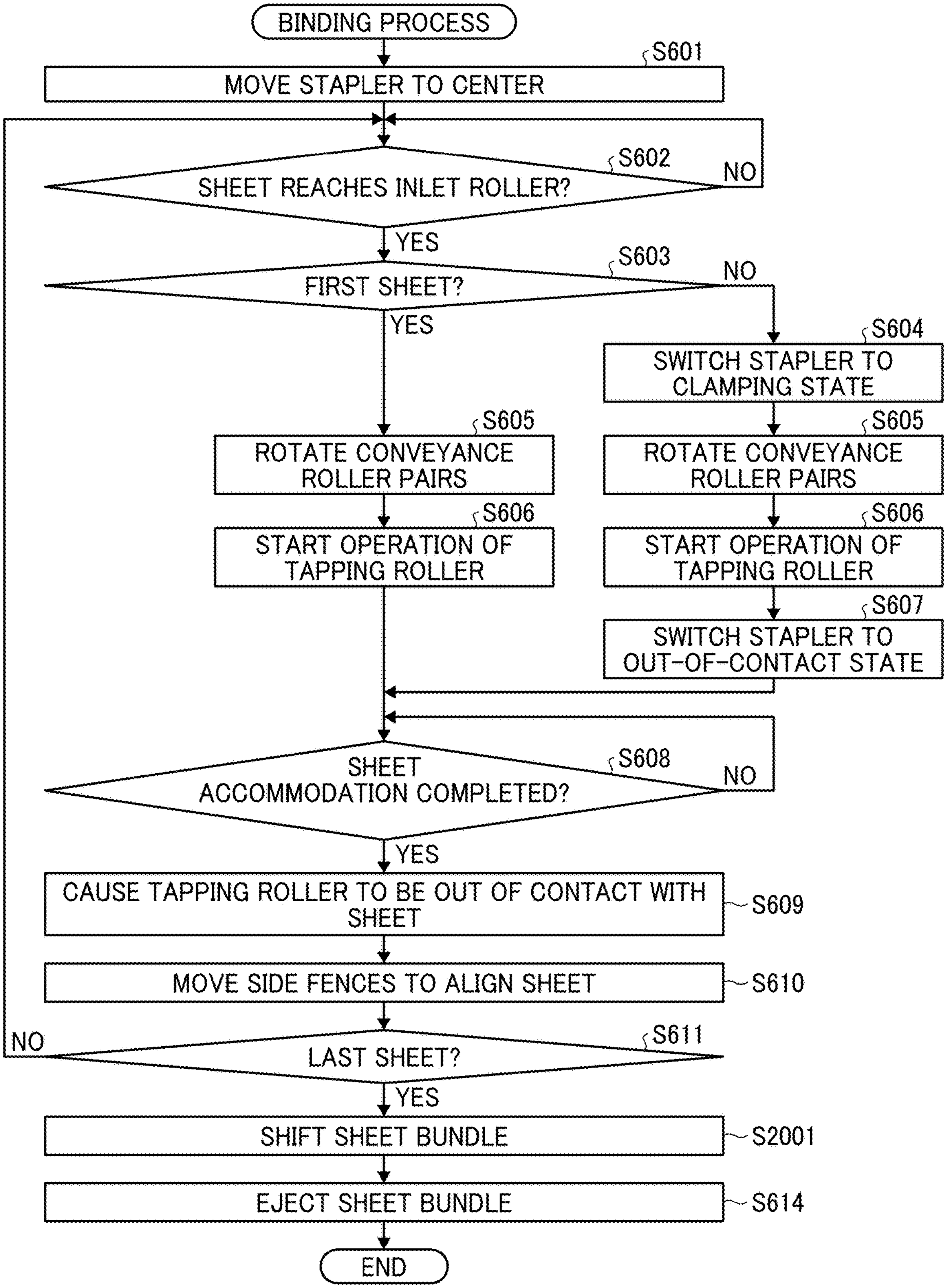
FIG. 20 is a flowchart of a binding process according to Modification 3.
Figure 21:
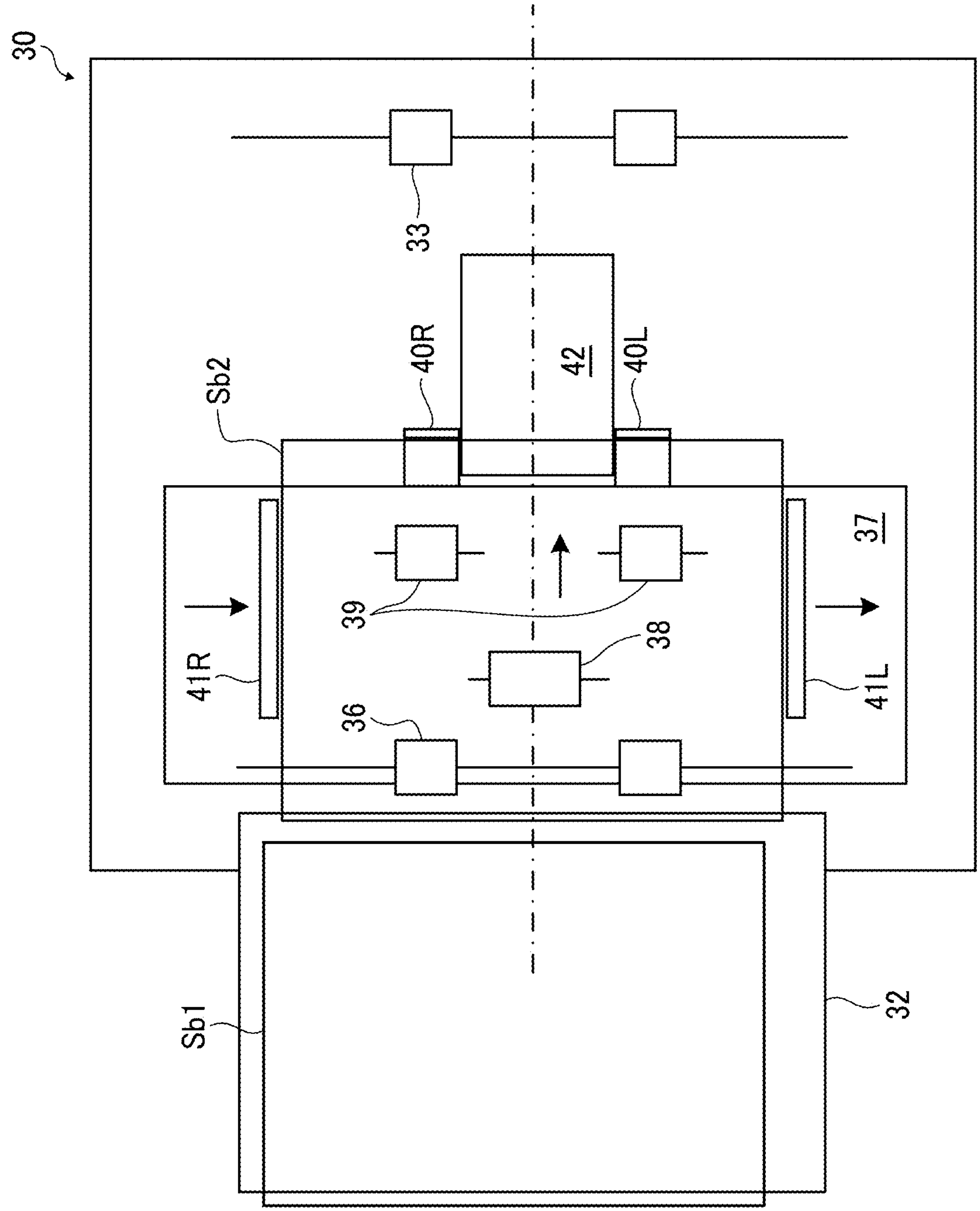
FIG. 21 is a plan view of the binding unit in step S2001 of FIG. 20.

Next, a binding unit 30 according to Modification 3 will be described with reference to FIGS. 20 and 21. FIG. 20 is a flowchart of a binding process according to Modification 3. FIG. 21 is a plan view of the binding unit 30 in step S2001 of FIG. 20. Detailed description may be omitted of common features of the above-described embodiments and the present modification. The following description is focused on the differences between the above-described embodiments and the present modification. The configuration of the binding unit 30 according to Modification 3 is the same as that of the above embodiment.

As illustrated in FIG. 20, the controller 100 according to Modification 3 executes the process of step S2001 instead of steps S612 to S613 of FIG. 6. On the other hand, the processes of steps S601 to S611 and S614 are common to FIGS. 6 and 20.

In a case where the controller 100 determines that the given number of sheets S are accommodated on the internal tray 37 (step S611: Yes), the controller 100 moves the side fences 41L and 41R to one side (that is, the same direction) in the main scanning direction as illustrated in FIG. 21 (step S2001). As a result, the position of the sheet bundle Sb stacked on the internal tray 37 can be shifted in the main scanning direction. For example, when the plurality of sheet bundles Sb1 and Sb2 is continuously ejected to the ejection tray 32, the sheet bundles Sb1 and Sb2 can be easily distinguished on the ejection tray 32 by shifting the positions of the sheet bundles Sb1 and Sb2 in the main scanning direction. That is, the post-process on the sheet bundle Sb1 is not limited to the binding process.

Modification 4

Figure 22:
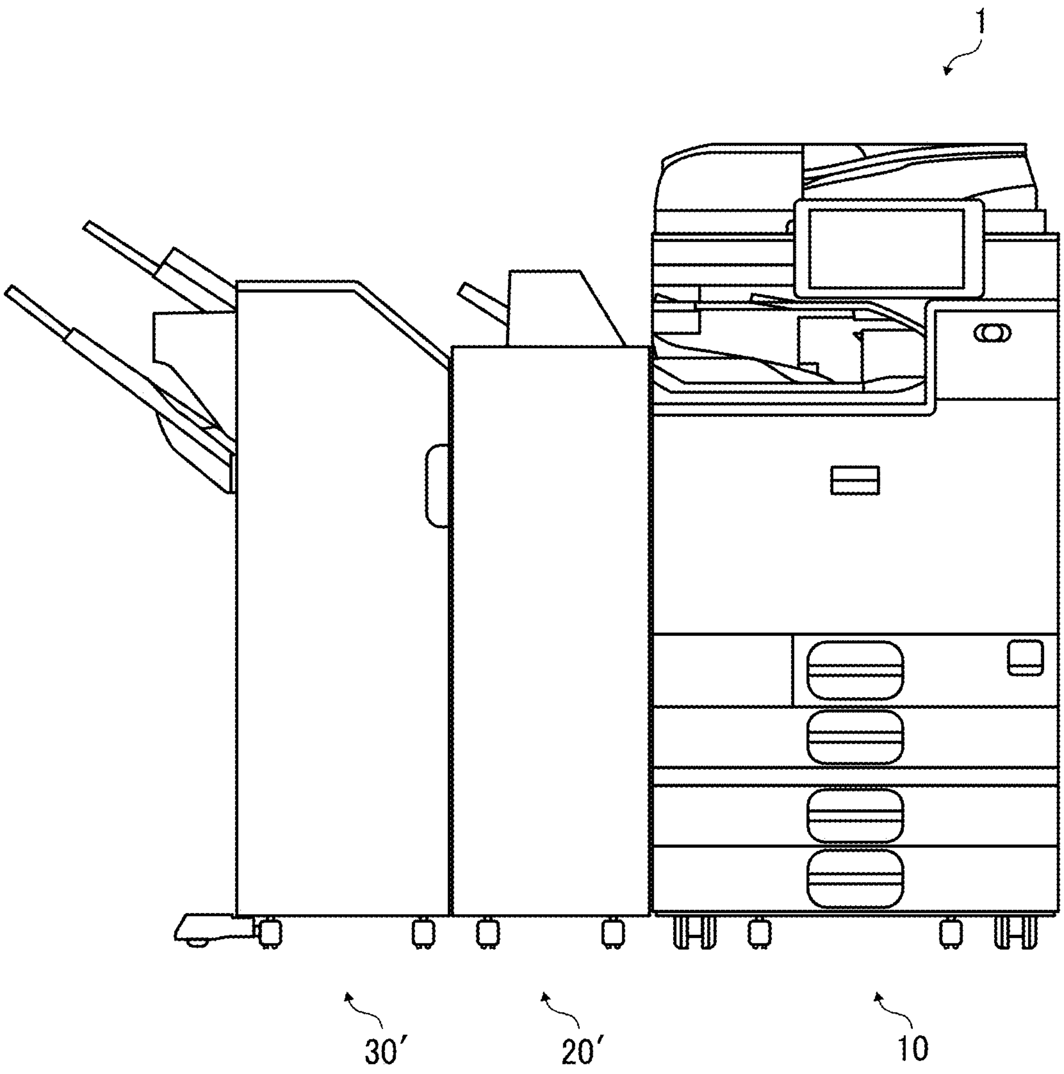
FIG. 22 is an external view of an image forming system according to an embodiment of the present disclosure.

FIG. 22 is an external view of an image forming system 1. As illustrated in FIG. 22, the image forming system 1 includes an image forming apparatus 10, a punch hole drilling unit 20', and a binding device 30'. The image forming apparatus 10, the punch hole drilling unit 20', and the binding device 30' are each independently operated and are mutually connected. In addition, the configuration of the punch hole drilling unit 20' is common to the punch hole drilling unit 20 described above, and the configuration of the binding device 30' is common to the binding unit 30 described above.

Note that the above-described embodiment and Modifications 1 to 4 can be combined in any combination without changing the gist of the present disclosure.

In addition, the present disclosure is not limited to the above-described embodiments, and various modifications can be made without departing from the technical gist thereof, and all technical matters included in the technical idea described in the claims are the subject of the present disclosure. It is therefore to be understood that the above-described embodiments of the present disclosure may be practiced otherwise by those skilled in the art than as specifically described herein. Such modifications and variations are included in the technical scope described in the appended claims.

The functionality of the elements disclosed herein may be implemented using circuitry, control circuitry, or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Aspects of the present disclosure are, for example, as follows.

First Aspect

A media processing apparatus includes: an internal tray and an ejection tray on which a plurality of sheet-shaped media is stacked; a first conveyor to convey a medium in a first conveyance direction leading to the ejection tray via the internal tray; a second conveyor to come into and out of contact with the medium stacked on the internal tray and convey the medium in a second conveyance direction that is a direction different from the first conveyance direction; a binder disposed at a downstream end of the internal tray in the second conveyance direction, to bind the plurality of media stacked on the internal tray; and a controller to control operations of the first conveyor, the second conveyor, and the binder. The binder is switchable among an out-of-contact state in which a pair of clampers disposed opposite to each other with the medium stacked on the internal tray interposed therebetween is out of contact with each other to receive the medium, a clamping state in which the medium is clamped by the pair of clampers, and a binding state in which the plurality of media is pressed and bound by the pair of clampers. The controller switches the binder into the clamping state when an (N+1)-th medium is conveyed in the first conveyance direction while contacting an N-th medium in a state in which N sheets of media are stacked on the internal tray, where N being a natural number.

Second Aspect

In the media processing apparatus according to the first aspect, the binder moves in a main scanning direction orthogonal to the second conveyance direction, and the controller switches, into the clamping state, the binder at a position including a center of the media stacked on the internal tray in the main scanning direction.

Third Aspect

In the media processing apparatus according to the second aspect, the controller moves the binder to a position including a center in the main scanning direction of the media stacked on the internal tray before a first medium reaches the internal tray.

Fourth Aspect

In the media processing apparatus according to the second or third aspect, in response to a given number of media being stacked on the internal tray, the controller moves the binder in the main scanning direction to a position facing a binding position of the media stacked on the internal tray, and switches the binder into the binding state at the position facing the binding position.

Fifth Aspect

In the media processing apparatus according to any one of the first to fourth aspects, the binder includes a stapler to insert a binding needle into and bind the media, and a crimping binder to press and deform the media to bind the media. The controller switches one of the stapler or the crimping binder into the clamping state when the (N+1)-th medium is conveyed in the first conveyance direction while contacting the N-th medium. In response to a given number of the media being stacked on the internal tray, the controller causes the other of the stapler or the crimping binder to bind the given number of media.

Sixth Aspect

In the media processing apparatus according to any one of the first to fourth aspects, the binder includes a crimping binder to press and deform the media to bind the media, and a stapler to insert a binding needle into and bind the media. The controller switches both of the stapler and the crimping binder arranged at positions separated in a main scanning direction orthogonal to the second conveyance direction into the clamping state when the (N+1)-th medium is conveyed in the first conveyance direction while contacting the N-th medium.

Seventh Aspect

In the media processing apparatus according to any one of the first to third aspects, the pair of clampers includes a pair of binding teeth having an uneven shape to press and deform the media stacked on the internal tray to bind the media, and a pair of auxiliary members to come into and out of contact with the media stacked on the internal tray together with the pair of binding teeth. The clamping state includes a first clamping state in which the media stacked on the internal tray are clamped by both the pair of binding teeth and the pair of auxiliary members, and a second clamping state in which the media stacked on the internal tray are clamped by only the pair of auxiliary members out of the pair of binding teeth and the pair of auxiliary members. In a case where the binder is disposed at the binding position to bind the media, the controller switches the binder into the first clamping state when the (N+1)-th medium is conveyed in the first conveyance direction while contacting the N-th medium. In a case where the binder is disposed at a position different from the binding position, the controller switches the binder into the second clamping state when the (N+1)-th medium is conveyed in the first conveyance direction while contacting the N-th medium.

Eighth Aspect

The media processing apparatus according to any one of the first to seventh aspects further includes: a pair of main scanning direction aligners disposed on both sides of the media stacked on the internal tray in a main scanning direction orthogonal to the second conveyance direction and that aligns positions of the plurality of media stacked on the internal tray in the main scanning direction. The controller moves the pair of main scanning direction aligners to one side in the main scanning direction to shift the media stacked on the internal tray in the main scanning direction.

Ninth Aspect

An image forming apparatus includes a housing, an image former that is housed in the housing and forms an image on a medium, and the media processing apparatus according to any one of the first to eighth aspects. The media processing apparatus is detachably supported by the housing and processes the medium on which the image is formed by the image former.

Tenth Aspect

According to a tenth aspect, an image forming system includes: an image forming apparatus to form an image on a medium; and the media processing apparatus according to any one of the first to eighth aspects that is connected to the image forming apparatus.

The invention claimed is:

1. A media processing apparatus, comprising:
an internal tray;
an ejection tray to stack sheet media;
a first conveyor to convey a sheet medium in a first conveyance direction leading to the ejection tray via the internal tray;
a second conveyor to come into and out of contact with the sheet medium stacked on the internal tray and convey the sheet medium in a second conveyance direction different from the first conveyance direction;
a binder disposed at a downstream end of the internal tray in the second conveyance direction, to bind sheet media stacked on the internal tray, the binder including a pair of clampers facing each other to clamp the sheet media stacked on the internal tray; and
control circuitry configured to control operations of the first conveyor, the second conveyor, and the binder,
the binder being switchable among
an out-of-contact state in which the pair of clampers are out of contact with each other to receive the sheet medium,
a clamping state in which the sheet media are clamped by the pair of clampers, and
a binding state in which the sheet media are pressed and bound by the pair of clampers,
the control circuitry configured to switch the binder into the clamping state when an (N+1)-th sheet medium is conveyed in the first conveyance direction while contacting an N-th sheet medium in a state in which N sheets of sheet media are stacked on the internal tray, wherein N is a natural number.

2. The media processing apparatus according to claim 1, wherein the binder moves in a main scanning direction orthogonal to the second conveyance direction, and
the control circuitry switches, into the clamping state, the binder at a position including a center of the sheet media stacked on the internal tray in the main scanning direction.

3. The media processing apparatus according to claim 2, wherein the control circuitry moves the binder to a position including a center in the main scanning direction of the sheet media stacked on the internal tray before a first medium reaches the internal tray.

4. The media processing apparatus according to claim 2, wherein in response to a given number of sheet media being stacked on the internal tray, the control circuitry moves the binder in the main scanning direction to a position facing a binding position of the sheet media stacked on the internal tray, and switches the binder into the binding state at the position facing the binding position.

5. The media processing apparatus according to claim 1, wherein the binder includes:

a stapler to insert a binding needle into and bind the sheet media; and a crimping binder to press and deform the sheet media to bind the sheet media, and the control circuitry switches one of the stapler or the crimping binder into the clamping state when the (N+1)-th sheet medium is conveyed in the first conveyance direction while contacting the N-th sheet medium, and in response to a given number of sheet media being stacked on the internal tray, the control circuitry causes the other of the stapler or the crimping binder to bind the given number of sheet media.

6. The media processing apparatus according to claim 1, wherein the binder includes:

a crimping binder to press and deform the sheet media to bind the sheet media; and a stapler to insert a binding needle into and bind the sheet media, and the control circuitry switches both of the stapler and the crimping binder arranged at positions away from in a main scanning direction orthogonal to the second conveyance direction into the clamping state when the (N+1)-th sheet medium is conveyed in the first conveyance direction while contacting the N-th sheet medium.

7. The media processing apparatus according to claim 1, wherein the pair of clampers includes a pair of binding teeth having an uneven shape to press and deform the sheet media stacked on the internal tray to bind the sheet media; and a pair of auxiliary members to come into and out of contact with the sheet media stacked on the internal tray, together with the pair of binding teeth, the clamping state includes a first clamping state in which the sheet media stacked on the internal tray are clamped by both the pair of binding teeth and the pair of auxiliary members, and a second clamping state in which the sheet media stacked on the internal tray are clamped by only the pair of auxiliary members out of the pair of binding teeth and the pair of auxiliary members, and in a case where the binder is disposed at a binding position to bind the sheet media, the control circuitry switches the binder into the first clamping state when the (N+1)-th sheet medium is conveyed in the first conveyance direction while contacting the N-th sheet medium, and in a case where the binder is disposed at a position different from the binding position, the control circuitry switches the binder into the second clamping state when the (N+1)-th sheet medium is conveyed in the first conveyance direction while contacting the N-th sheet medium.

8. The media processing apparatus according to claim 1, further comprising:

a pair of main scanning direction aligners disposed on both sides of the sheet media stacked on the internal tray in a main scanning direction orthogonal to the second conveyance direction, to align positions of the sheet media stacked on the internal tray in the main scanning direction, wherein the control circuitry moves the pair of main scanning direction aligners to one side in the main scanning direction to shift the sheet media stacked on the internal tray in the main scanning direction.

9. An image forming apparatus, comprising:

a housing;

an image former housed in the housing to form an image on a sheet medium; and the media processing apparatus according to claim 1, wherein the media processing apparatus is detachably supported by the housing and processes the sheet medium on which the image is formed by the image former.

10. An image forming system, comprising:

an image forming apparatus to form an image on a sheet medium; and the media processing apparatus according to claim 1 that is connected to the image forming apparatus.

11. A media processing method, comprising:

conveying, with a first conveyor, a sheet medium in a first conveyance direction leading to an ejection tray via an internal tray;

coming a second conveyor into and out of contact with the sheet medium stacked on the internal tray and conveying the sheet medium in a second conveyance direction different from the first conveyance direction;

binding, with a binder, sheet media stacked on the internal tray;

controlling operations of the first conveyor, the second conveyor, and the binder, the binder being switchable among an out-of-contact state in which a pair of clampers of the binder are out of contact with each other to receive the sheet medium, a clamping state in which the sheet media are clamped by the pair of clampers, and a binding state in which the sheet media are pressed and bound by the pair of clampers; and switching the binder into the clamping state when an (N+1)-th sheet medium is conveyed in the first conveyance direction while contacting an N-th sheet medium in a state in which N sheets of sheet media are stacked on the internal tray, wherein N is a natural number.

12. The media processing method according to claim 11, further comprising:

moving the binder in a main scanning direction orthogonal to the second conveyance direction, wherein the switching includes switching, into the clamping state, the binder at a position including a center of the sheet media stacked on the internal tray in the main scanning direction.

13. The media processing method according to claim 12, further comprising:

moving the binder to a position including a center in the main scanning direction of the sheet media stacked on the internal tray before a first medium reaches the internal tray.

14. The media processing method according to claim 12, further comprising:

in response to a given number of sheet media being stacked on the internal tray, moving the binder in the main scanning direction to a position facing a binding position of the sheet media stacked on the internal tray, wherein the switching includes switching the binder into the binding state at the position facing the binding position.

15. The media processing method according to claim 11, wherein the switching includes switching one of a stapler or a crimping binder of the binder into the clamping state when the (N+1)-th sheet medium is conveyed in the first conveyance direction while contacting the N-th sheet medium, and the binding includes, in response to a given number of sheet media being stacked on the internal tray, binding the given number of sheet media with the other of the stapler or the crimping binder.

16. The media processing method according to claim 11, wherein the switching includes switching both of a stapler and a crimping binder of the binder arranged at positions away from in a main scanning direction orthogonal to the second conveyance direction into the clamping state when the (N+1)-th sheet medium is conveyed in the first conveyance direction while contacting the N-th sheet medium.

17. The media processing method according to claim 11, wherein the clamping state includes a first clamping state in which the sheet media stacked on the internal tray are clamped by both a pair of binding teeth and a pair of auxiliary members in the pair of clampers, and a second clamping state in which the sheet media stacked on the internal tray are clamped by only the pair of auxiliary members out of the pair of binding teeth and the pair of auxiliary members, in a case where the binder is disposed at a binding position to bind the sheet media, the switching includes switching the binder into the first clamping state when the (N+1)-th sheet medium is conveyed in the first conveyance direction while contacting the N-th sheet medium, and in a case where the binder is disposed at a position different from the binding position, the switching includes switching the binder into the second clamping state when the (N+1)-th sheet medium is conveyed in the first conveyance direction while contacting the N-th sheet medium.

18. The media processing method according to claim 11, further comprising:

aligning positions of the sheet media stacked on the internal tray in a main scanning direction, with a pair of main scanning direction aligners; and moving the pair of main scanning direction aligners to one side in the main scanning direction to shift the sheet media stacked on the internal tray in the main scanning direction.

* * * * *